United States Patent
Gross et al.

(10) Patent No.: US 11,863,868 B1
(45) Date of Patent: Jan. 2, 2024

(54) PHYSICAL CHARACTERIZATION OF CAMERA SYSTEM FOR SUPER-RESOLUTION IMAGING

(71) Applicant: Apple Inc., Cupertino, CA (US)

(72) Inventors: Kevin A Gross, San Francisco, CA (US); Wei Luo, San Jose, CA (US); Ronan S. Kerviche, San Jose, CA (US); Shaun M. Pacheco, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 188 days.

(21) Appl. No.: 17/476,315

(22) Filed: Sep. 15, 2021

Related U.S. Application Data

(60) Provisional application No. 63/083,768, filed on Sep. 25, 2020.

(51) Int. Cl.
| | |
|---|---|
| *H04N 23/67* | (2023.01) |
| *G06T 7/70* | (2017.01) |
| *G06T 7/80* | (2017.01) |
| *G06T 3/40* | (2006.01) |
| *G06T 7/00* | (2017.01) |
| *H04N 23/80* | (2023.01) |

(52) U.S. Cl.
CPC ......... *H04N 23/671* (2023.01); *G06T 3/4053* (2013.01); *G06T 7/0002* (2013.01); *G06T 7/70* (2017.01); *G06T 7/80* (2017.01); *H04N 23/80* (2023.01); *G06T 2207/30244* (2013.01)

(58) Field of Classification Search
CPC .... H04N 23/671; H04N 23/80; G06T 3/4053; G06T 7/0002; G06T 7/70; G06T 7/80; G06T 2207/30244
USPC ......................................................... 348/349
See application file for complete search history.

(56) References Cited

U.S. PATENT DOCUMENTS

2017/0071727 A1* 3/2017 Hyde .................... A61F 2/1654

OTHER PUBLICATIONS

Yifan Peng, et al., "Focal Sweep Imaging with Multi-focal Diffractive Optics", 2018 IEEE International Conference on Computational Photography (ICCP). IEEE, 2018, pp. 1-8.

* cited by examiner

*Primary Examiner* — Usman A Khan
(74) *Attorney, Agent, or Firm* — Robert C. Kowert; Kowert, Hood, Munyon, Rankin & Goetzel, P.C.

(57) ABSTRACT

Systems and methods for characterizing a camera system on a mobile device are disclosed. Characterization of the camera system may be implemented by providing a diffraction pattern of dots at controlled, defined angles to the camera system. Images of the diffraction pattern may be captured during a focus sweep through predetermined focus positions and/or while changing the relative locations between the lens and image sensor at the predetermined focus positions. The captured images may be analyzed to determine calibration data that provides physical measurement of properties of the camera system. The calibration data may then be implemented by the camera system to produce enhanced imaging on the mobile device.

20 Claims, 19 Drawing Sheets

PHYSICAL CHARACTERIZATION OF CAMERA SYSTEM FOR SUPER-RESOLUTION IMAGING

BACKGROUND

This application claims benefit of priority to U.S. Provisional Application Ser. No. 63/083,768, entitled "Physical Characterization of Camera System for Super-Resolution Imaging," filed Sep. 25, 2020, and which is hereby incorporated herein by reference in its entirety.

TECHNICAL FIELD

Embodiments described herein relate to camera systems. More particularly, embodiments described herein relate to methods for determining properties of lenses in camera systems and utilizing the determined properties to generate enhanced images in the camera systems.

DESCRIPTION OF THE RELATED ART

Mobile devices such as smartphones or tablets typically include camera systems to capture images using the devices. A camera system includes one or more lenses placed in front of an image sensor where the lenses direct and focus light onto the image sensor for capturing images. Lens used in these devices typically have optical aberrations such as field curvature. Optical aberrations occur in the lens due to constraints in design manufacturing of the lens. Optical aberrations will occur even in high quality designs and manufacturing processes. In an ideal situation, a curved image sensor that matches the field curvature in the lens would be utilized to produce better sharpness and depth-of-field in images (e.g., a perfectly flat wall is imaged as a flat wall). Curved image sensors, however, are not suitable for these types of devices as the spaces within the devices is typically limited and there is no room within the device to place curved image sensors. Additionally, the curvature of an image sensor in each individual device would have to be matched to the lens in each individual device, which can be expensive and time consuming. Thus, image sensors in these types of devices are typically flat image sensors, which are not matched to the optical aberrations in the lens.

To overcome the issues with using curved lenses in combination with flat image sensors, these devices may implement methods that compensate for the optical aberrations (e.g., field curvature) in the lens by combining frames from multiple images to generate a better resolution image. Certain methods for generating a better resolution image include capturing images during a through focus sweep using the camera and then interrogating data from the images on a per pixel basis to determine which input images are in best focus for each of the pixels. Based on the interrogation of the image data, the image data may be combined across multiple images to generate a single image from the captured images (e.g., combined using a super-resolution method). The image data is combined in the spatial domain based on estimated sub-pixel shifts (estimated via either hand motion, lens-to-sensor motion, or a combination thereof) and color channels that are determined independent of the modulation orientation. Then, given output pixels are determined through a weight sum of pixel values from the captured images based on image-shift (e.g., homography) and color channel to generate the single image, which may have a better resolution than the originally captured images.

These methods, however, rely on interrogation of the images after the images are captured. The resolution of the single image generated from the multiple captured images may also be limited as the image is only interrogated in the spatial domain (e.g., the images are interrogated to compensate only for tangential field curvature in the lens). For better imaging results (e.g., images that are in better focus), compensation in both tangential and sagittal (e.g., radial) field curvature surfaces of the lens may be made. Compensating in both field curvature surfaces may, however, be difficult in the limited spaces for these types of devices and/or require complex calculations that are time consuming on these types of devices.

SUMMARY

Physical characterization of a camera system may be implemented to determine calibration data for the camera system. Physical characterization may include determining optical aberrations and/or optical distortions of lenses and an image sensor in the camera system. In certain embodiments, the camera system is characterized by capturing images of a diffraction pattern of dots (e.g., light objects) that are imaged at pre-defined distances or spatial locations such as infinity or other distances that can be focused by the camera system. Images of the diffraction pattern may be captured at predetermined focus positions during a focus sweep using the camera system. Based on the assessment of the sharpness score of the dots (e.g. size, or spatial frequency response score, or full-width-half-maximum) over the focus sweep, best focus positions and field curvature of the lenses in the camera system may be determined.

In certain embodiments, multiple images of the diffraction pattern are captured at each predetermined focus positions during the focus sweep. The multiple images captured at each predetermined focus position may include images captured at two or more spatially shifted positions. The spatially shifted images may be combined to generate a higher resolution image at each predetermined focus position. The higher resolution images may then be utilized to recover optical fields for each dot in the diffraction pattern. Data such as field curvature, point spread function (PSF), and spatial frequency response (SFR) may be extracted using the recovered optical fields.

Data generated of best focus positions, field curvature, PSF, SFR, and other data that may be extracted from the recovered optical fields may be implemented by the camera system to generate images using multi-image super-resolution methods. Utilizing the generated data allows the multi-image super-resolution methods to generate better quality images that have increased focus and better sharpness across the image.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
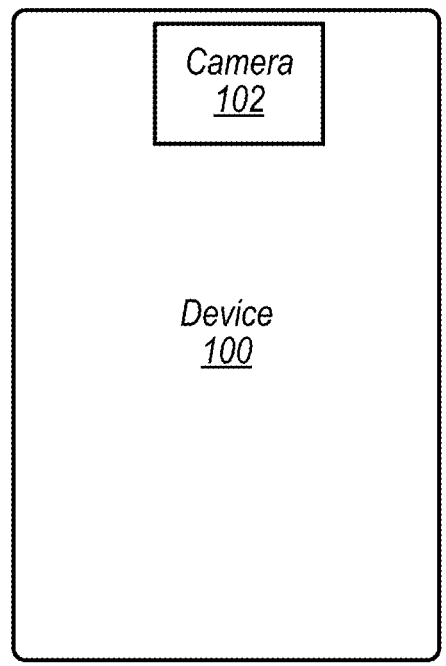
FIG. 1 depicts a representation of an embodiment of mobile device 100.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently, being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

FIG. 1 depicts a representation of an embodiment of mobile device 100. Device 100 may be a small multipurpose computing device including any of various types of a computer system device that is mobile or portable and is capable of performing wireless communication. Examples of mobile devices include, but are not limited to, cell phones, smartphones, pad or tablet computing devices, laptop, netbook, notebook, subnotebook, and ultrabook computers. Various other types of devices may fall into this category if they include wireless or RF communication capabilities (e.g., Wi-Fi, cellular, and/or Bluetooth) and have a camera, such as portable gaming devices, portable Internet devices, and other handheld devices, as well as wearable devices. As described herein, the term "mobile device" may be defined to encompass any multipurpose electronic, computing, and/or telecommunications device (or combination of devices) that is easily transported by a user, is capable of wireless communication (using, for example, WLAN, Wi-Fi, cellular, and/or Bluetooth), and has a camera, where the device's primary purpose is telecommunication, computing, and/or electronic gaming.

In certain embodiments, device 100 includes camera 102. Camera 102 may be located either front-facing on device 100 (e.g., facing on same side as a display of the mobile device) and/or back-facing on the device (e.g., facing on an opposite side as the display). In some embodiments of device 100, camera 102 is placed in a pair with an internal strobe. In other embodiments, groupings of multiple cameras 102 and/or multiple internal strobes may also be contemplated (e.g., two cameras grouped with one internal strobe).

Figure 2:
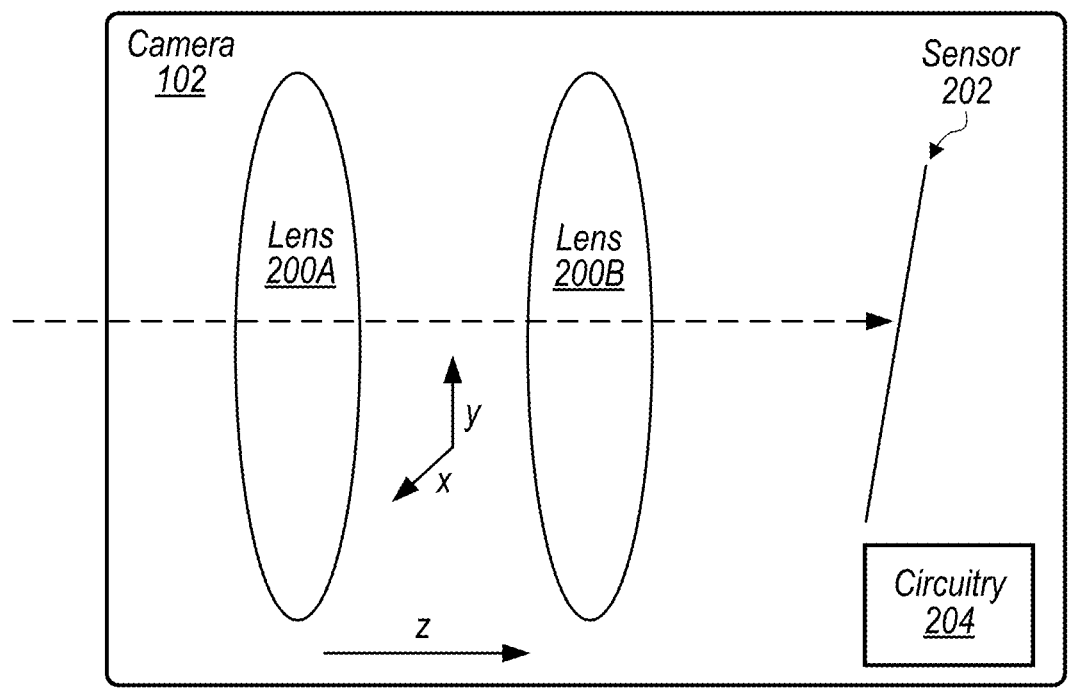
FIG. 2 depicts a side view representation of an embodiment of a camera showing lenses and an image sensor.

In certain embodiments, camera 102 includes one or more lenses and an image sensor. FIG. 2 depicts a side view representation of an embodiment of camera 102 showing lenses 200 and image sensor 202. While camera 102 is shown to include two lenses (lens 200A and lens 200B) in the depicted embodiment, it is to be understood that the number of lenses in the camera may vary. Lens 200A and lens 200B focus incident light towards image sensor 202. In certain embodiments, image sensor 202 receives light projected through lenses 200 and converts the light to data representing an image. Image sensor 202 may be, for example, an optical sensor. FIGS. 23-26 illustrate example mobile devices with example cameras including example optical sensors (e.g., optical sensor 1964).

Image sensor 202, along with circuitry 204 coupled to the image sensor, may generate one or more images or video captured by the image sensor. In some embodiments, the images or video are displayed on a display of device 100 or stored in a memory of the device. As described above, in many embodiments, lenses 200 have one or more optical aberrations that affect the quality (e.g., focus or resolution) of images captured by image sensor 202. In certain embodiments, circuitry 204 compensates for the optical aberrations in lenses 200 to generate better quality images from images captured by image sensor 202. Circuitry 204 may, for example, implement calibration data for camera 102 (e.g., the combination of lenses 200 and image sensor 202) to generate better quality images using the camera. The calibration data may include data that characterizes camera 102 based on measurements taken using the camera itself.

Figure 3:
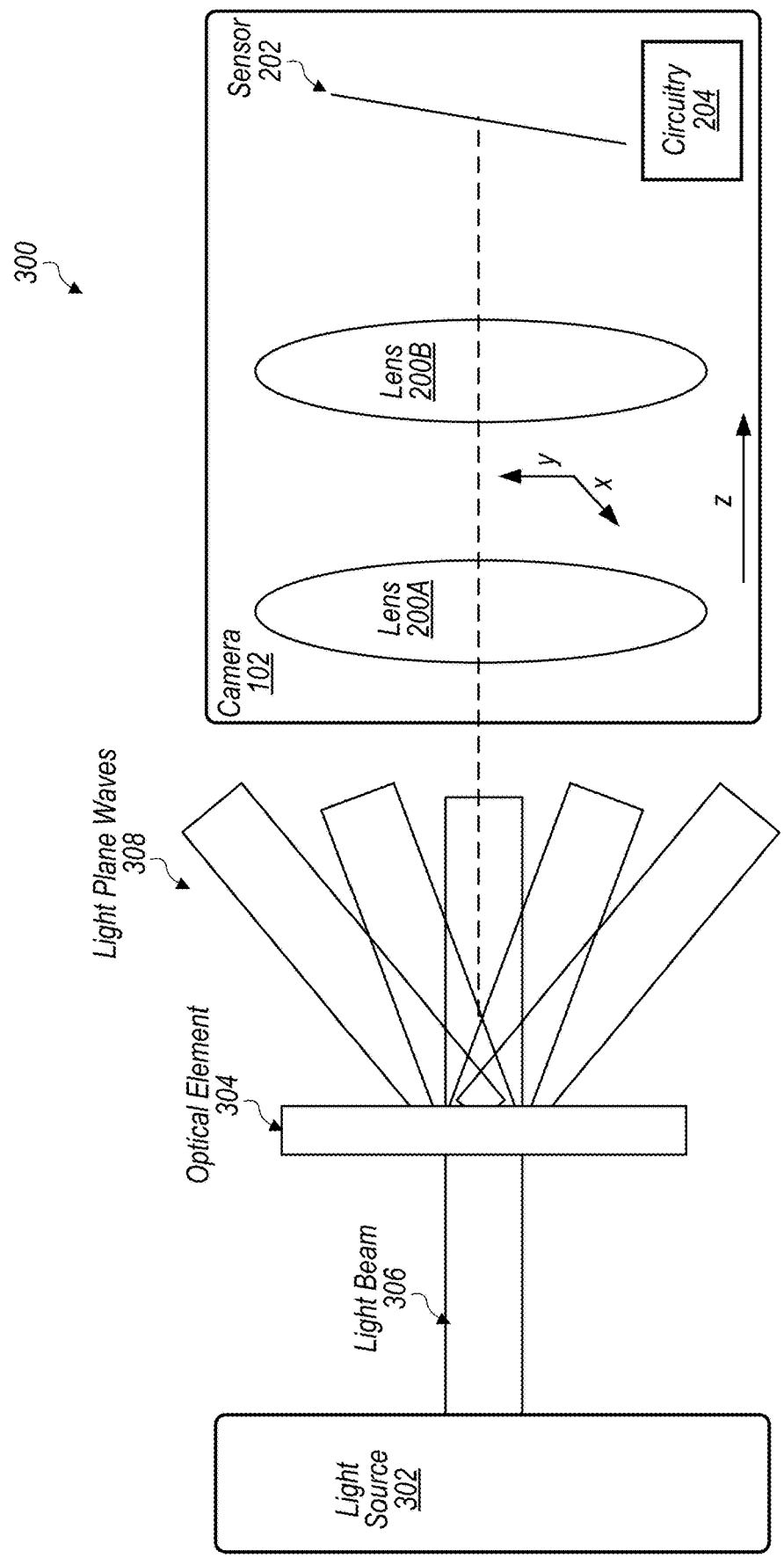
FIG. 3 depicts a side view representation of an embodiment of a calibration system for a camera.

FIG. 3 depicts a side view representation of an embodiment of calibration system 300 for camera 102. In certain embodiments, calibration system 300 includes light source 302 and optical element 304. Light source 302 provides light beam 306 towards optical element 304. In certain embodiments, light beam 306 is a structured light beam. Light beam 306 may be, for example, a collimated light beam (or a collimated light plane wave). In some embodiments, light beam 306 is a monochromatic light beam. For example, light source 302 may be a laser providing light beam 306 at a specific wavelength. In one embodiment, light source 302 provides light beam 306 at a green light wavelength (e.g., a wavelength between about 520 nm and about 570 nm).

In certain embodiments, optical element 304 is a diffractive optical element. Optical element 304 splits light beam 306 (e.g., a collimated light plane wave) into multiple light plane waves 308. Light plane waves 308 are light plane waves at controlled and well-defined (e.g., known) angles. When camera 102 is placed in front of optical element 304, as shown in FIG. 3, light plane waves 308 are imaged as objects at predefined spatial locations by camera 102 (e.g., camera 102 images a diffraction pattern of light objects at predefined spatial locations where the light objects correspond to light plane waves 308). The predefined spatial locations may include, for example, infinity or other locations that can be focused by camera 102. In certain embodiments, light plane waves 308 are imaged as a pattern of dots originating from predefined spatial locations by camera 102.

Figure 4:
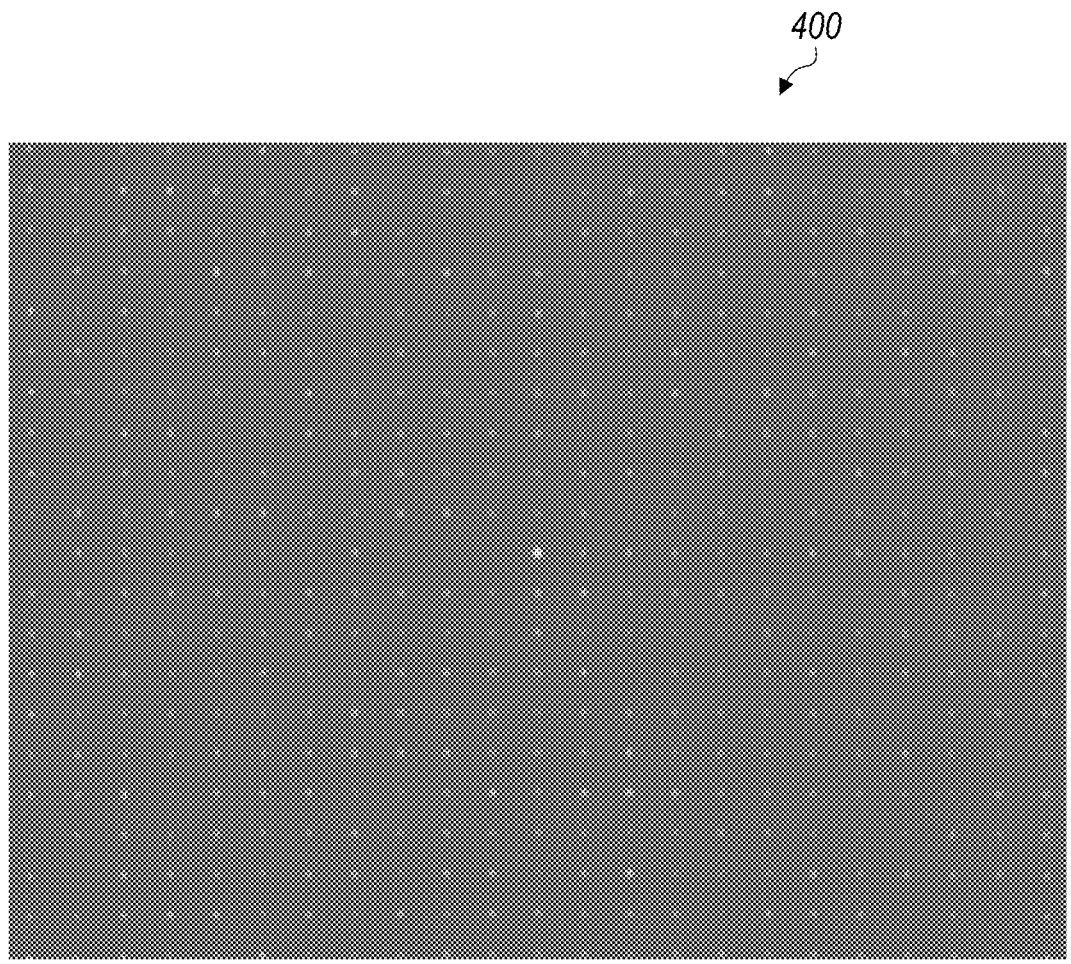
FIG. 4 depicts an example diffraction pattern of dots originating from predefined spatial locations as imaged by a camera.

If there are no optical aberrations in camera 102, image sensor 202 would image a pattern of objects with equivalent characteristics (e.g., sharpness, size, brightness, etc.) that correspond to light plane waves 308. Optical aberrations in camera 102 (e.g., optical aberrations in lenses 200), however, changes characteristics of the objects in the pattern of light plane waves 308. FIG. 4 depicts an example diffraction pattern 400 of dots originating from the predefined spatial locations as imaged by camera 102. The dots in diffraction pattern 400 may have variations in optical characteristics that may be assessed as described herein. For example, as can be seen in FIG. 4, the dots have variations in sharpness and brightness in the diffraction pattern.

Figure 5:
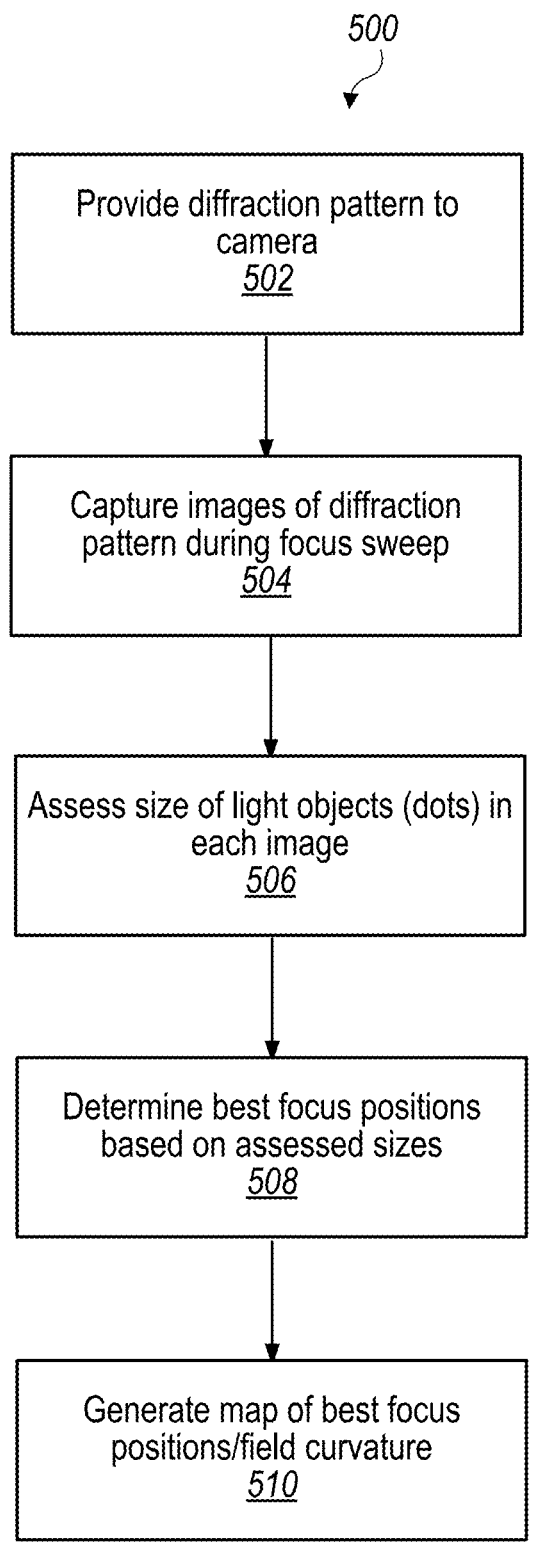
FIG. 5 depicts a flow diagram illustrating a method for determining field curvature calibration data for lenses in a camera, according to some embodiments.

FIG. 5 depicts a flow diagram illustrating method 500 for determining field curvature calibration data for lenses 200 in camera 102, according to some embodiments. At 502, in the illustrated embodiment, a diffraction pattern is provided to camera 102 in calibration system 300. As described above in the embodiment of FIG. 3, a collimated light beam passing through a diffraction optical element generates a diffraction pattern of light objects (e.g., dots) that are imaged at predefined spatial locations by camera 102 in calibration system 300. At 504, images of the diffraction pattern are captured during a focus sweep using camera 102. The focus sweep may include, for example, stepping lenses 200 through a plurality of predetermined focus positions relative to image sensor 202 and capturing an image at each of the predetermined focus positions. In some embodiments, the focus sweep is performed at or near infinity focus for lenses 200 relative to image sensor 202.

At 506, the locations and sharpness (e.g., sharpness scores) of the light objects (e.g., dots) are assessed in image space at each of the predetermined focus positions. In certain embodiments, assessing the locations and sharpness of the light objects includes assessing the size or SFR score of each light object in the image captured at each predetermined focus position. The locations and sharpness of light objects (dots) may be assessed using image processing techniques.

At 508, best focus positions for each of the light objects may be determined based on the assessed sharpness (e.g., sharpness scores) of the light objects at the predetermined focus positions. In certain embodiments, the best focus position for each light object is determined independent of the predetermined focus positions used during the focus sweep (e.g., the best focus position does not have to be one of the predetermined focus positions used). In some embodiments, the best focus position for each light object is based on assessing the change in sharpness of the light object over the predetermined focus positions (e.g., a comparison of dot sharpness versus focus position). In some embodiments, a focal length, a distortion and a camera orientation are determined based on the assessed locations of each of the light objects at each of the predetermined focus positions.

Figure 6:
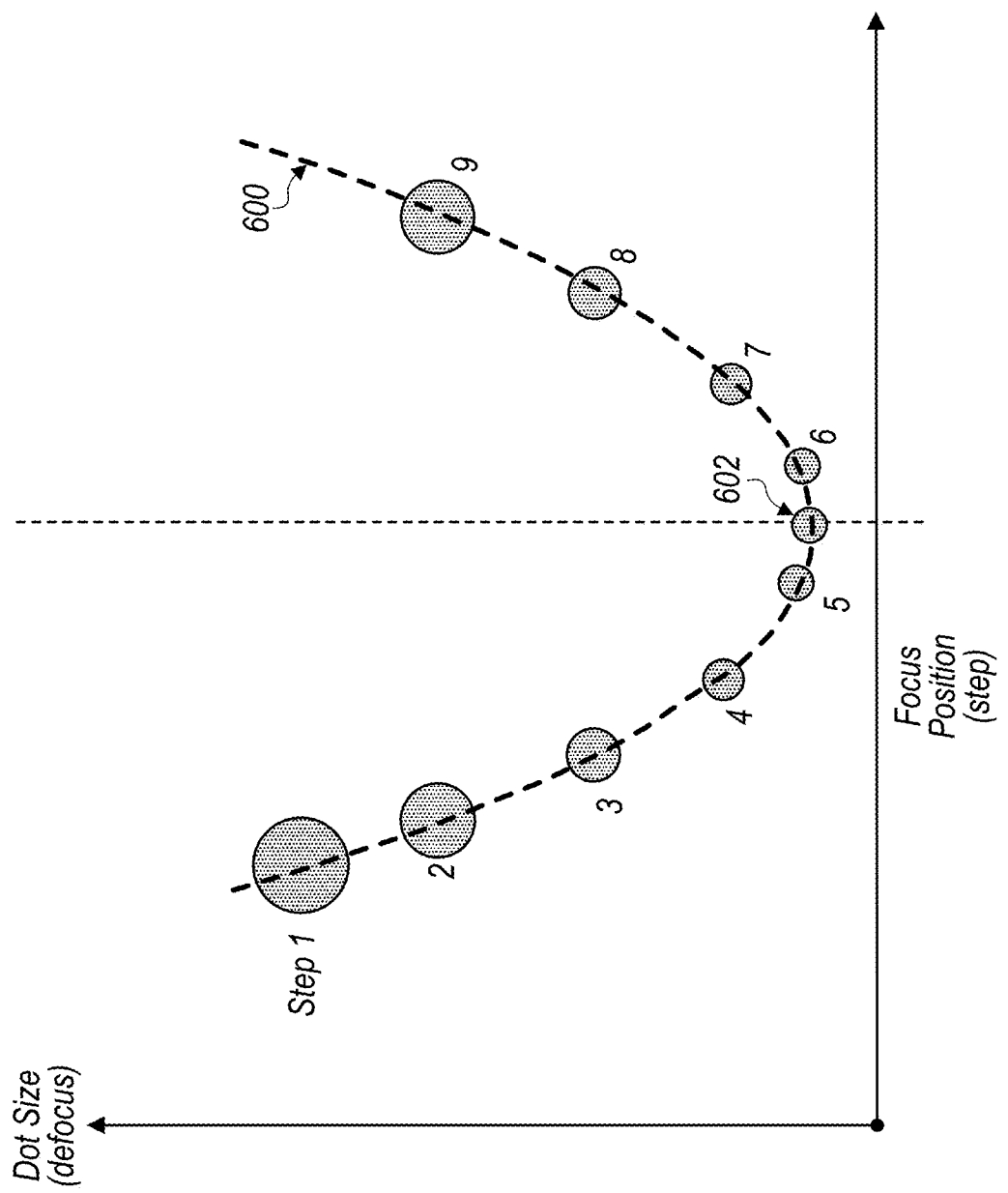
FIG. 6 depicts an example plot of dot (light object) size versus focus position.

FIG. 6 depicts an example plot of dot (light object) size versus focus position. As shown in FIG. 6, a plot of data for dot size (e.g., sharpness) versus focus position may follow a parabolic function. The best focus position for the dot that corresponds to the data in the plot may be the minimum dot size determined for the plot of dot size versus focus position. Fitting of the data of dot size versus focus position may be used to determine (or predict) the best focus position for the dot that corresponds to the data in the plot. For example, as shown in FIG. 6, parabolic line 600 may be used to fit the data in the plot. The vertex of parabolic line 600 may be determined as the best focus position (e.g., position 602 in FIG. 6 is the position for the minimum dot size for the dot that corresponds to the data in the plot). Thus, parabolic curve fitting of the data of light object size (e.g., dot size) versus predetermined focus position may be used to determine the best focus position for the light object based on the vertex of the parabolic curve. Parabolic curve fitting may be implemented for each light object in the captured images (e.g., each light object in the diffraction pattern) to determine a best focus position for each light object. In some embodiments, focal length data for each light object may be used to describe the best focus positions for each light object. The parabolic curve fitting may be used to determine the focal length data for each light object.

Figure 7:
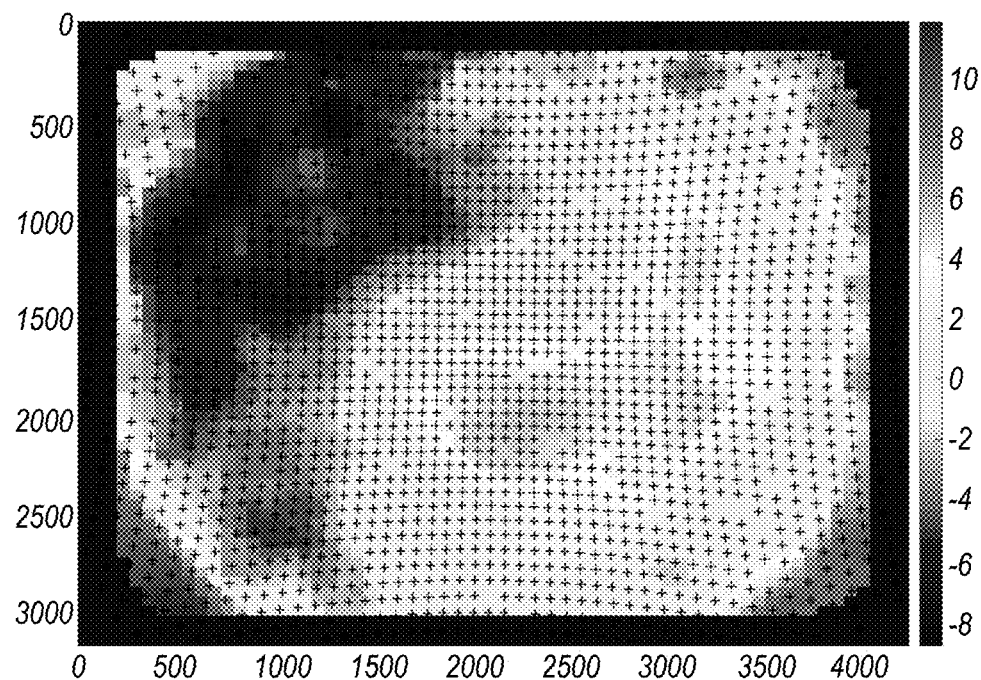
FIG. 7 depict an example of a map generated from best focus positions for a camera system.
Figure 8:
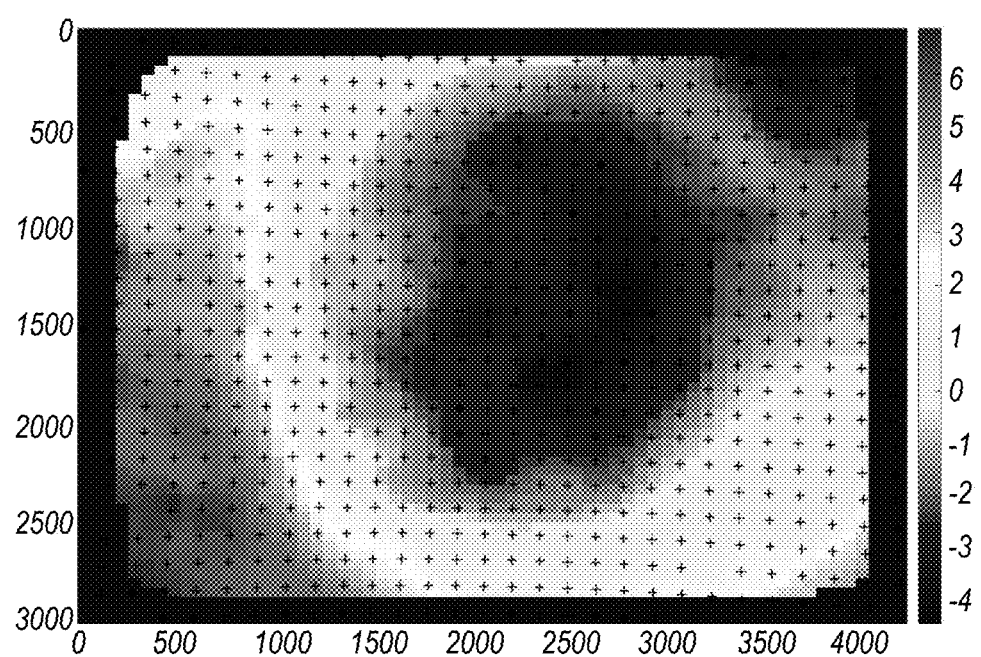
FIG. 8 depict another example of a map generated from best focus positions for a camera system.

Returning to FIG. 5, with the best focus position determined for each light object in the captured images, a map of the best focus positions for each light object may be generated at 510. FIGS. 7 and 8 depict examples of maps generated from best focus positions for two different camera systems (e.g., two different pairs of lenses and image sensors). The generated maps of the best focus positions for each light object may be heat maps of the best focus positions. The heat maps may correspond to or represent the field curvature (e.g., Petzval field curvature) of lenses 200 that focus images onto image sensor 202 in camera 102 in both the tangential and sagittal planes. As used herein, the tangential plane includes the primary ray and the optical axis of lenses 200 while the sagittal plane (e.g., the radial plane) includes only the primary ray and is positioned perpendicular to the tangential plane. The field curvature (e.g., as shown in FIGS. 7 and 8) corresponds to the specific lenses and image sensors in the camera system placed in calibration system 300, thus providing a physical measurement/characterization of the actual field curvature in both tangential and sagittal planes for camera 102.

Data corresponding to the maps generated from best focus positions for camera 102 (e.g., calibration data/parameters for field curvature of lenses 200) may be stored in device 100 to be used for image processing of images captured by the camera. For example, in some embodiments, device 100 may implement the field curvature calibration data for lenses 200 to generate better focused images for camera 102. A better focused image may be generated by capturing multiple images of a scene using camera 102 and combining the captured images to produce a single image with better focus throughout the scene. The field curvature calibration data for lenses 200 may be used to select the captured images that provide the best focus for different depths within the captured scene (with depths known from additional sensor data (e.g., a depth sensor, described herein) or calculated for the captured images). Knowing the different depths within the captured scene, the captured images may be combined according to the field curvature calibration data, which describes the best focus position for different depths. For example, weighting functions based on the field curvature calibration data may be applied for combining the captured images to generate a single image. Applying the field curvature calibration data in determining how the captured images are combined applies physical characterization of camera 102 to generate better resolution images. In some embodiments, applying the field curvature calibration data may generate an image that is not only in better focus throughout the scene but also the image is sharper than the image would be by capturing a single image with an equivalent lens with no field curvature. Examples of other applications of the field curvature data for image processing are described herein.

As described above for method 500 depicted in FIG. 5, images captured at each predetermined focus position may be used to assess field curvature parameters (e.g., field curvature properties) for lenses 200 in camera 102. In certain embodiments, methods that include capturing additional images at each of the predetermined focus positions are used to assess additional calibration data for camera 102. The additional calibration data may include intrinsic and/or extrinsic parameters/properties of camera 102.

Figure 9:
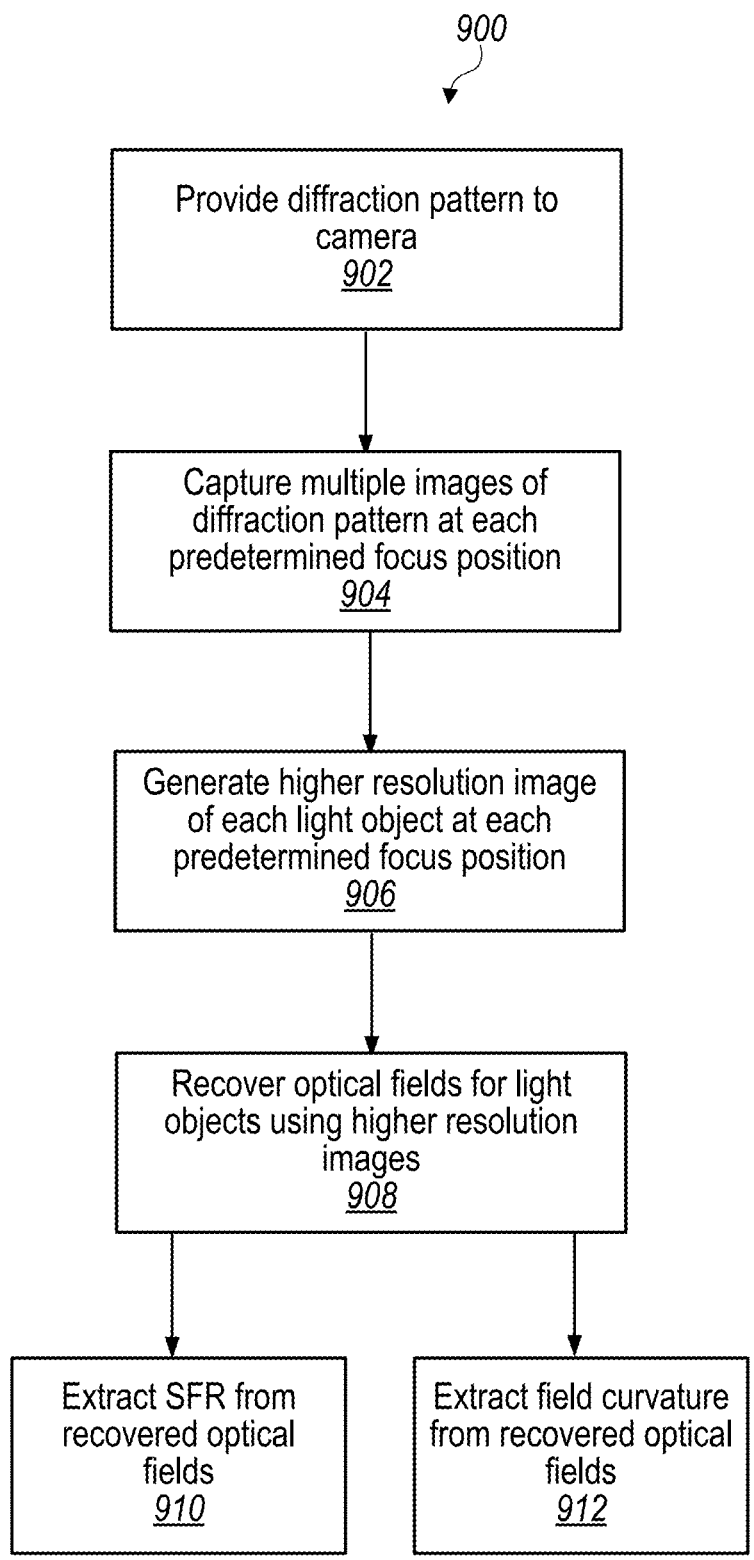
FIG. 9 depicts a flow diagram illustrating a method for determining calibration data for a camera, according to some embodiments.

FIG. 9 depicts a flow diagram illustrating method 900 for determining calibration data for camera 102, according to some embodiments. At 902, in the illustrated embodiment, a diffraction pattern is provided to camera 102 in calibration system 300, as described herein. At 904, multiple images are captured at each predetermined focus position in a focus sweep for camera 102. In certain embodiment, the images captured at each predetermined focus position include images captured at two or more spatially shifted positions. Spatially shifted positions may include positions that are shifted within the plane. For focus sweeps, as shown in FIG. 3, lenses 200 may be moved in a z-direction relative to sensor 202 to move between the predetermined focus positions (e.g., the lenses are moved closer to or further away from the sensor to move between focus positions). Moving lenses 200 in x- and y-directions (x-direction being in/out of page and y-direction being up/down on page) relative to sensor 202 may spatially shift positions between the lenses and the sensor, which causes spatial shifts between the sensor and optical element 304 (e.g., the source of the diffraction pattern).

Figure 10:
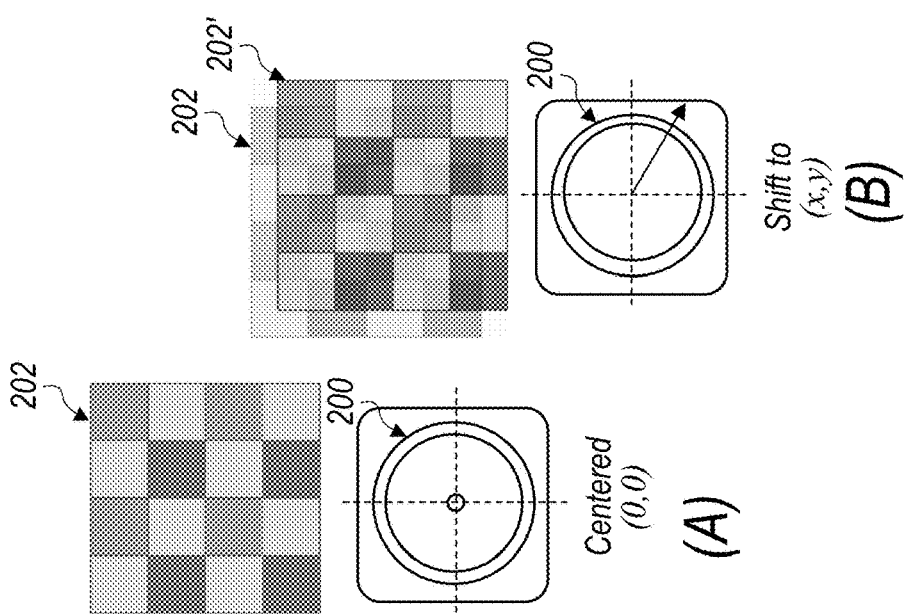
FIG. 10 depicts a representation of an embodiment of spatially shifting a lens relative to an image sensor.

FIG. 10 depicts a representation of an embodiment of spatially shifting lens 200 relative to image sensor 202. In (A), lens 200 is centered in the x- and y-directions relative to image sensor 202. In (B), lens 200 is shifted in the x- and y-directions, which shifts image sensor 202 into a spatially shifted position relative to the lens, as represented by image sensor 202'. In certain embodiments, lens 200 is moved in the x- or y-directions using image stabilization components in camera 102 (such as optical image stabilization components). Embodiments may also be contemplated where lens 200 is moved using other mechanisms or image sensor 202 is moved using an image stabilization mechanism while lens 200 remains in a fixed position.

Moving and spatially shifting lens 200 relative to image sensor 202 allows the image sensor to fully sample light from the diffraction pattern at every image coordinate on the image sensor. As described above, light beam 306 may be monochromatic (e.g., a green light wavelength). Image sensor 202, however, may include red, green, and blue (RGB) pixel sensors. Thus, the red and blue sensors will detect far less light from a green light beam and image sensor 202 will not detect a complete green light object (e.g., dot) when the green light object is incident on only the red and blue sensors. Spatially shifting lens 200 relative to image sensor 202 allows the green sensors across the image sensor to sample light from the diffraction pattern.

Returning to FIG. 9, as described above, capturing images in 904 includes stepping lenses 200 through each of the predetermined focus positions relative to image sensor 202 while capturing images at multiple spatially shifted positions of the lenses and the image sensor at each predetermined focus position. Capturing the images in 904 provides redundant spatial sampling of the diffraction pattern provided to camera 102. In some embodiments, the spatially shifted images can be combined to generate a higher resolution image that reduces pixilation in the individual images and enables characterization of parameters (e.g., properties) for camera 102.

Figure 11:
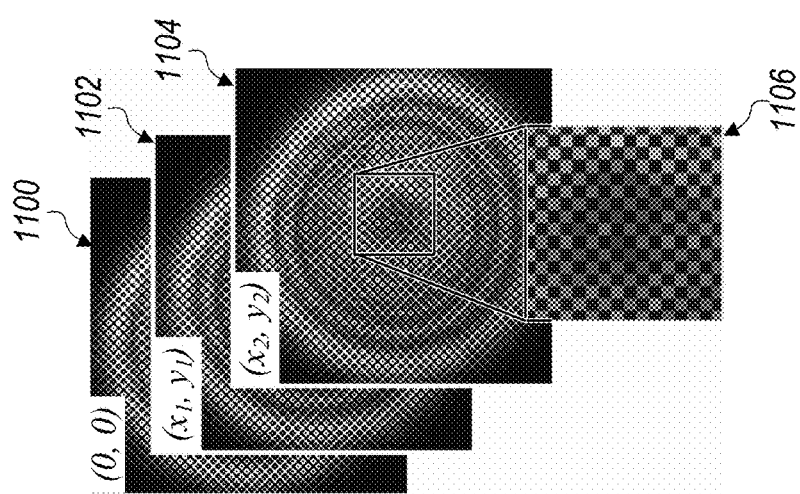
FIG. 11 depicts examples of multiple images captured at spatially shifted positions.

FIG. 11 depicts examples of multiple images captured at spatially shifted positions. Image 1100 is captured at coordinates of $(X_0, Y_0)$, image 1102 is captured at coordinates of $(X_1, Y_1)$, and image 1104 is captured at coordinates of $(X_2, Y_2)$. As shown by enlarged inset 1106 of image 1104, a center of the light object (e.g., the dot) may be pixelated. Such pixelation may reduce the amount of information that can be extracted from the image.

Returning to FIG. 9, at 906, a higher resolution image of each light object at each predetermined focus position is generated (e.g., a higher resolution image is generated from images 1100, 1102, 1104, shown in FIG. 11). Generating the higher resolution image may include generating a super-resolution image from the lower resolution images. In some embodiments, generating the super-resolution image includes implementing gradient-based shift estimation on the multiple images.

Figure 12:
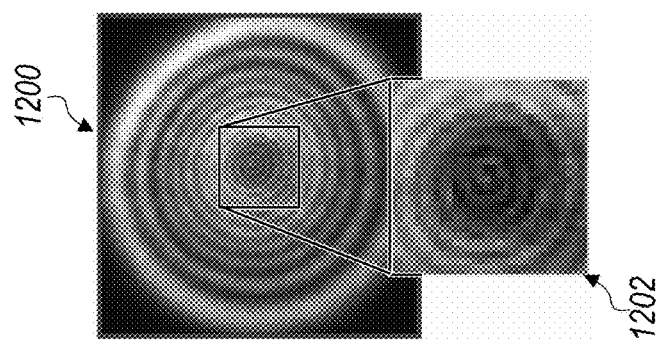
FIG. 12 depicts an example of a super-resolution image generated from the images depicted in FIG. 11.

FIG. 12 depicts an example of a super-resolution image generated from the images depicted in FIG. 11. Image 1200 is a super-resolution image generated from images 1100, 1102, 1104. Enlarged inset 1202 of image 1200 depicts the center of the light object. Inset 1202 has a higher resolution than inset 1106, shown in FIG. 11, and depicts higher resolution characteristics of the light object.

Turning back to FIG. 9, at 906, images such as image 1200 are generated for each light object at each predetermined focus position using the images captured at spatially shifted positions. The images generated at 906 are higher resolution images of the light objects than the originally captured images. The higher resolution images of the light objects allow for extraction of more parameters for camera 102 than would be available using the originally captured images.

At 908, after the higher resolution images (such as image 1200) are generated, optical fields for the light objects may be recovered using the higher resolution images. In some embodiments, the optical field is recovered for each light object in the diffraction pattern. In certain embodiments, a phase retrieval algorithm is applied to the higher resolution images to recover the optical fields. The optical field of a light object includes both amplitude and phase of the light object. The images of a light object captured by image sensor 202 include direct measurements of the amplitude (e.g., brightness) of the optical field. The field, however, is complex and its phase cannot be measured directly from images captured by image sensor 202 or the higher resolution images generated from the captured images. With the higher resolution in the images generated in 906, the optical field for each light object in the diffraction pattern may be recovered and the recovered optical field can be used to determine both amplitude and phase of each light object at any focus position.

In some embodiments, the phase retrieval algorithm includes applying an iterative algorithm, such as a Gerchberg-Saxton algorithm, to the higher resolution images. Such a phase retrieval algorithm may be iteratively, over the predetermined focus positions, applied to the higher resolution images to recover (e.g., retrieve) the optical field for a light object. For example, for applying a Gerchberg-Saxton algorithm, the optical field at an initial predetermined focus position may be described by:

$$f_n(x,y) = a_n(x,y) \cdot e^{j\phi_n(x,y)}; \text{ where}(a_n(x,y)) \text{describes changes in amplitude and}$$

($e^{j\phi}n^{(x,y)}$) is a spherical wave describing changes in phase.

The above equation can be used to provide an initial guess at the optical field based on the ground truth amplitude (e.g., measured amplitude) at the initial predetermined focus position. Wave propagation may then be used to provide a prediction of the optical field at additional predetermined focus positions described by:

$$g_{n+1}(x,y) = |g_{n+1}(x,y)| \cdot e^{j\phi}n+1^{(x,y)}.$$

The amplitude in the prediction may then be replaced with the ground truth amplitude at any predetermined focus position to describe the optical field by:

$$f_{n+1}(x,y) = a_{n+1}(x,y) \cdot e^{j\phi}n+1^{(x,y)}.$$

The above equations may be iteratively applied through each of the predetermined focus positions until the predicted amplitude is substantially consistent (e.g., consistent to some predetermined level (such as 95% match or higher)) with the measured amplitude (determined directly from the images). At the end of the iteration, the optical field described by the equation is the recovered optical field for the light object (e.g., dot) in the diffraction pattern. The recovered optical field provides a description of the optical aberrations affecting transmission of light from each light object through camera 102 (e.g., transmission of light from each light object through lenses 200 as captured by image sensor 202). The recovered optical field provides a tool for determining (e.g., predicting) the amplitude and phase of the light object at any focus position (regardless of whether the focus position is a predetermined focus position). In certain embodiments, the recovered optical field generated by the phase retrieval algorithm provides an accurate prediction tool of the amplitude and phase of a light object.

Figures 13, 14A, 14B:
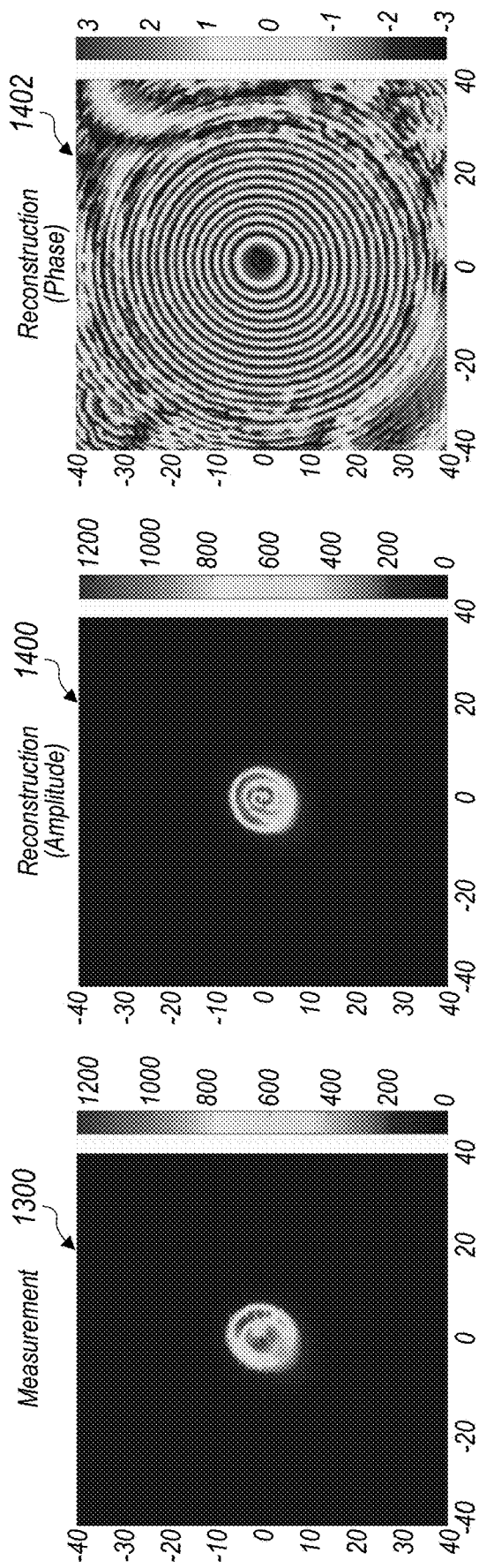
FIG. 13 depicts an image of an example light object in a diffraction pattern captured by an image sensor at a first predetermined focus position.
FIG. 14A depicts a representation of the reconstructed amplitude for the recovered optical field of an image at a first predetermined focus position.
FIG. 14B depicts a representation of the reconstructed phase for the recovered optical field of an image at a first predetermined focus position.

FIGS. 13-16 illustrate examples of measured determinations of amplitude compared to amplitudes and phases determined from recovered optical fields. FIG. 13 depicts an image of an example light object in a diffraction pattern captured by image sensor 202 at a first predetermined focus position. Image 1300 may be, for example, a higher resolution image (e.g., super-resolution image) of the light object at the first predetermined focus position generated by gradient-based shift estimation from multiple images captured at the predetermined focus position. As shown in FIG. 13, image 1300 of the light object shows the intensity for the light object.

FIG. 14A depicts a representation of the reconstructed amplitude for the recovered optical field of image 1300 at the first predetermined focus position. Reconstructed amplitude 1400 may be the amplitude for the optical field recovered by applying the phase retrieval algorithm to image 1300. As shown in FIG. 14A, reconstructed amplitude 1400 for the light object is a relatively good match (e.g., is substantially consistent with) amplitude in image 1300 of the light object. FIG. 14B depicts a representation of the reconstructed phase for the recovered optical field of image 1300 at the first predetermined focus position. Reconstructed phase 1402 is the phase for the optical field recovered along with reconstructed amplitude 1400. As shown in FIG. 14B, reconstructed phase 1402 is complex compared to reconstructed amplitude 1400.

Figures 15, 16A, 16B:
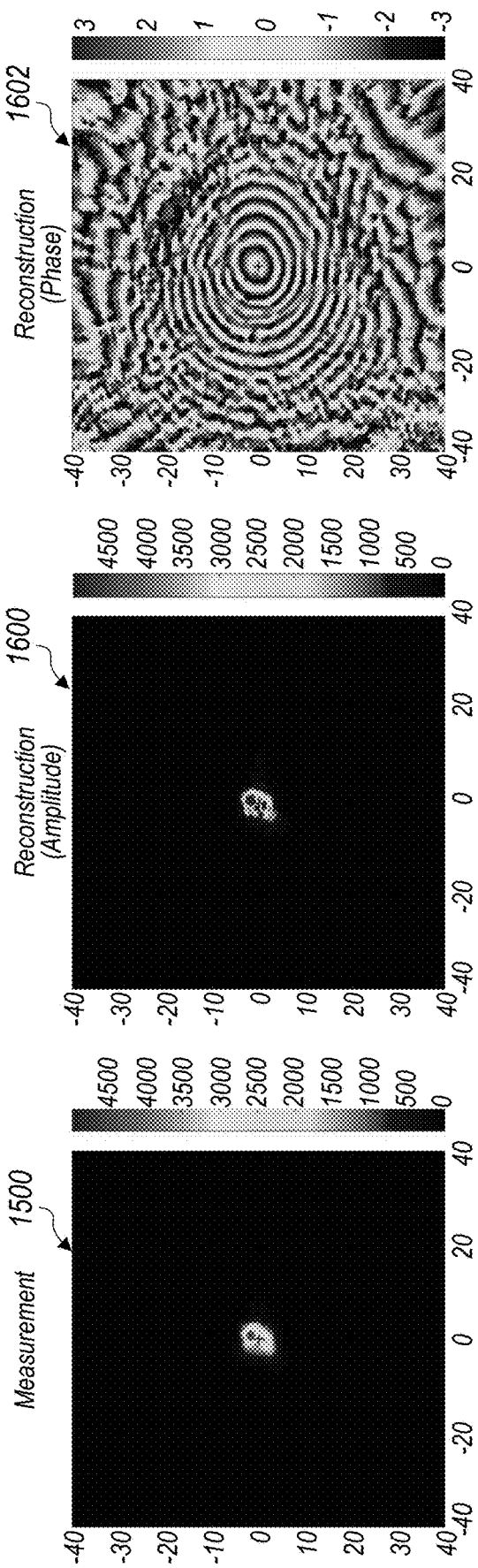
FIG. 15 depicts an image of an example light object in a diffraction pattern captured by an image sensor at a second predetermined focus position.
FIG. 16A depicts a representation of the reconstructed amplitude for the recovered optical field of an image at a second predetermined focus position.
FIG. 16B depicts a representation of the reconstructed phase for the recovered optical field of an image at a second predetermined focus position.

FIG. 15 depicts an image of an example light object in a diffraction pattern captured by image sensor 202 at a second predetermined focus position. In this example, the second predetermined focus position is a different focus position from the first predetermined focus position shown in FIG. 13. Image 1500 may be, for example, a higher resolution image (e.g., super-resolution image) of the light object at the second predetermined focus position generated by gradient-based shift estimation from multiple images captured at the predetermined focus position. As shown in FIG. 15, image 1500 of the light object shows the intensity for the light object.

FIG. 16A depicts a representation of the reconstructed amplitude for the recovered optical field of image 1500 at the second predetermined focus position. Reconstructed amplitude 1600 may be the amplitude for the optical field recovered by applying the phase retrieval algorithm to image 1500. As shown in FIG. 16A, reconstructed amplitude 1600 for the light object is a relatively good match (e.g., is substantially consistent with) amplitude in image 1500 of the light object. FIG. 16B depicts a representation of the reconstructed phase for the recovered optical field of image 1500 at the second predetermined focus position. Reconstructed phase 1602 is the phase for the optical field recovered along with reconstructed amplitude 1600. As shown in FIG. 16B, reconstructed phase 1602 is complex compared to reconstructed amplitude 1600.

As described above, the recovered optical field may provide an accurate determination (e.g., prediction) of the amplitude and phase of the light object at any focus position regardless of whether the focus position is one of the predetermined focus positions or not. Returning to FIG. 9, in 908, the phase retrieval algorithm may be used to generate a recovered optical field for each light object in the diffraction pattern. The optical fields recovered in 908 may be utilized to determine additional calibration data (e.g., various intrinsic and/or extrinsic parameters) for camera 102, lenses 200, and image sensor 202.

In certain embodiments, spatial frequency response (SFR) is extracted from the recovered optical fields in 910. SFR may provide a measurement of the sharpness of images that are captured by image sensor 202. SFR data may be used as calibration data to adjust sharpness or other properties of images captured by image sensor 202 to improve the quality of the images. The recovered optical fields may be similar to point spread functions (PSFs). An SFR score corresponding to each PSF for each light object may be generated by taking a Fourier transform of each optical field at each light object. Data for the resulting SFR scores may include data that correlates location on image sensor 202 to the SFR scores to provide an SFR map across the image sensor (e.g., a plot of SFR score versus location). SFR scores may be one type of data describing optical aberrations in camera 102 that is utilized to during operation of the camera to generate better quality images.

As the recovered optical fields include both amplitude and phase, SFR scores may be generated for full two-dimensional (2D) planes of image sensor 202. SFR scores may, for instance, be generated for both the tangential and sagittal planes of image sensor 202. In certain embodiments, SFR scores may be determined at specific spatial frequencies associated with image sensor 202. For example, SFR scores may be determined at Nyquist over 8 (a period that is 16 times the pixel pitch in image sensor 202) or at Nyquist over 4 (a period that is 8 times the pixel pitch in the image sensor). Data at one or more of the specific spatial frequencies may be utilized as calibration data during operation of camera 102 to generate better quality images, as described herein.

Figure 17A:
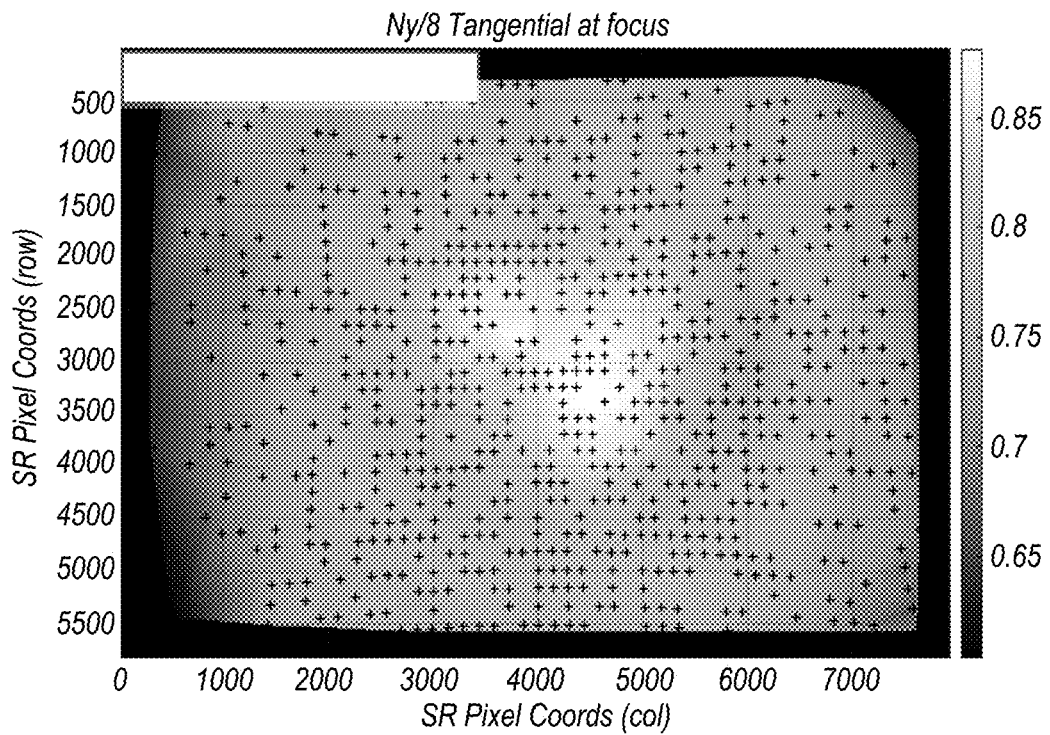
FIG. 17A depicts an image representation of tangential plane SFR scores determined at Nyquist over 8 (Nyquist/8) from recovered optical fields.
Figure 17B:
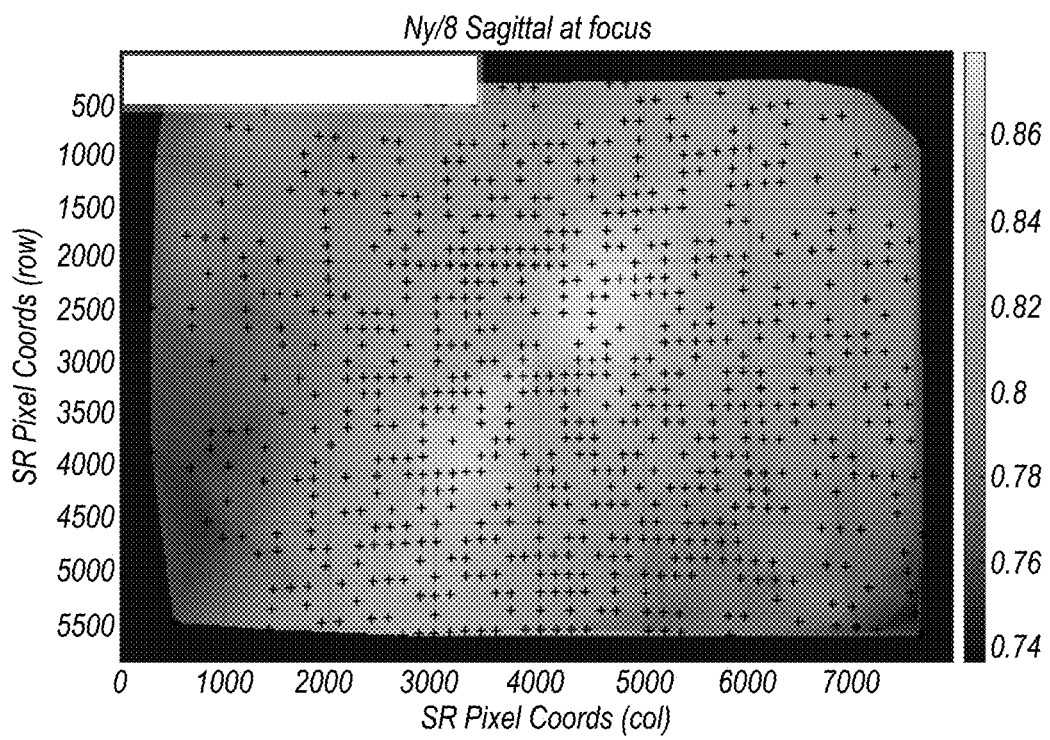
FIG. 17B depicts an image representation of sagittal plane SFR scores determined at Nyquist/8 from recovered optical fields.
Figure 18A:
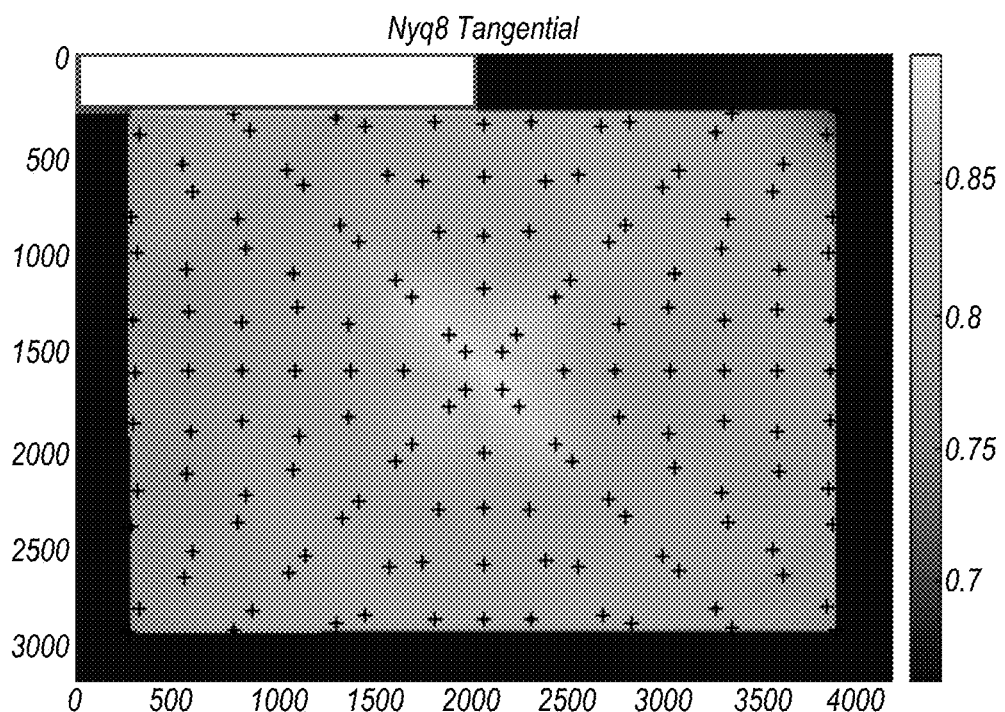
FIG. 18A depicts an image representation of tangential plane SFR scores determined at Nyquist/8 using a circle SFR method.
Figure 18B:
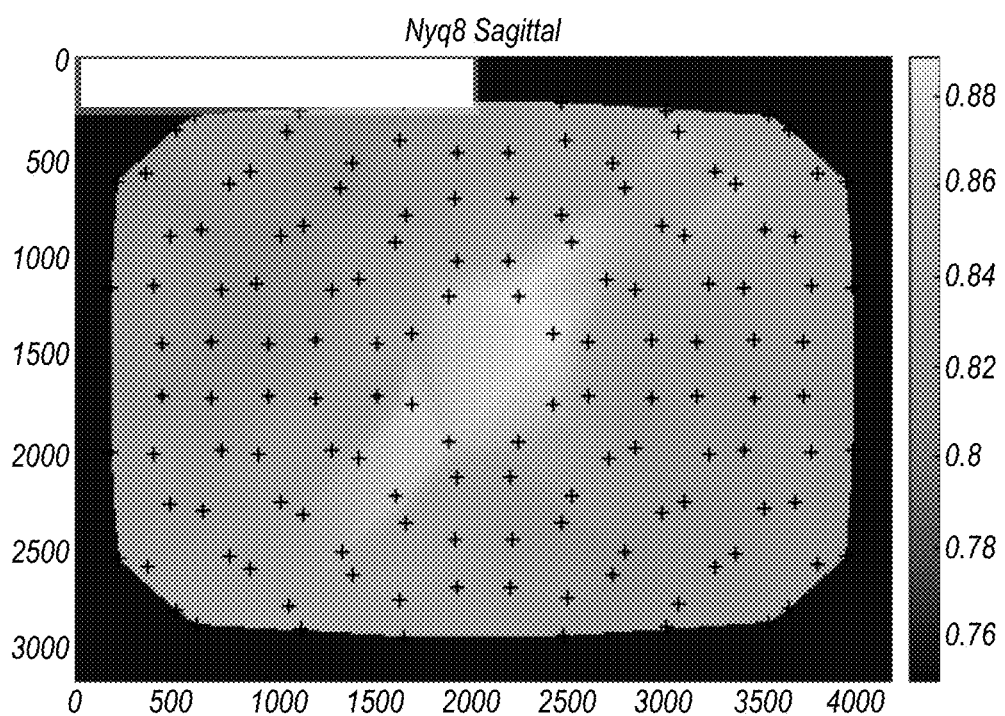
FIG. 18B depicts an image representation of sagittal plane SFR scores determined at Nyquist/8 using the circle SFR method.

Determining SFR scores from the recovered optical fields using method 900 may provide better representations of the SFR scores for camera 102 than other known methods. FIG. 17A depicts an image representation of tangential plane SFR scores determined at Nyquist over 8 (Nyquist/8) from recovered optical fields using method 900 for an example camera system. FIG. 17B depicts an image representation of sagittal plane SFR scores determined at Nyquist/8 from recovered optical fields using method 900 for the example camera system. FIG. 18A depicts an image representation of tangential plane SFR scores determined at Nyquist/8 using a circle SFR method for the example camera system. FIG. 18B depicts an image representation of sagittal plane SFR scores determined at Nyquist/8 using the circle SFR method for the example camera system. The circle SFR method includes capturing images of printed test charts of circle or square patterns to extract SFR scores from edges of the patterns.

Figure 19A:
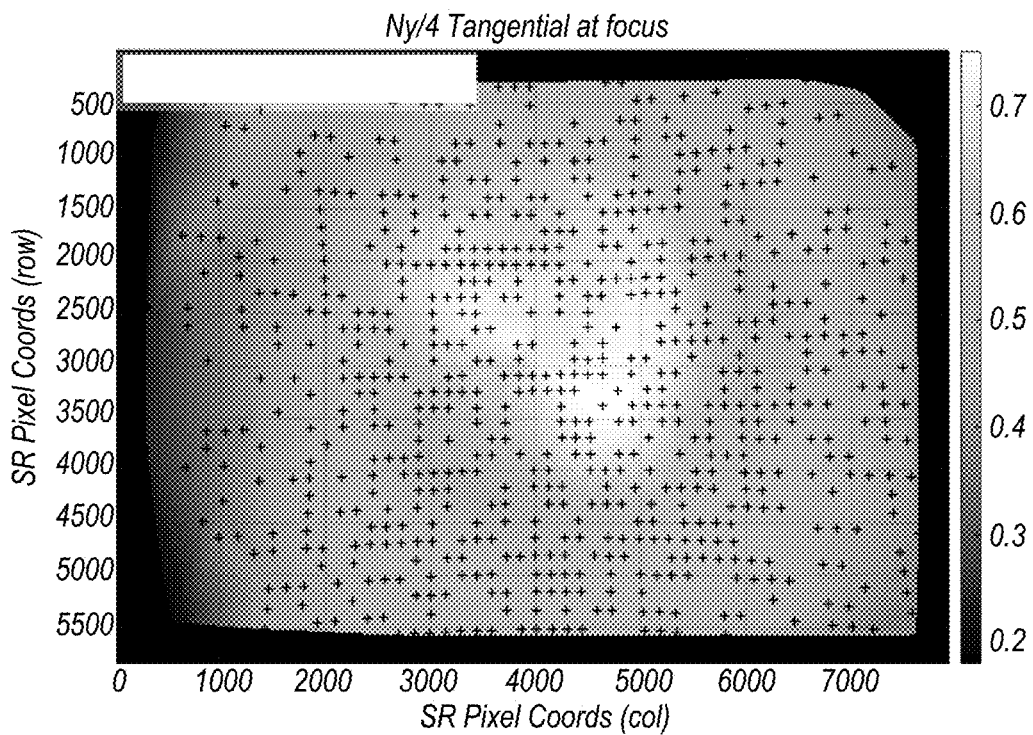
FIG. 19A depicts an image representation of tangential plane SFR scores determined at Nyquist over 4 (Nyquist/4) from recovered optical fields.
Figure 19B:
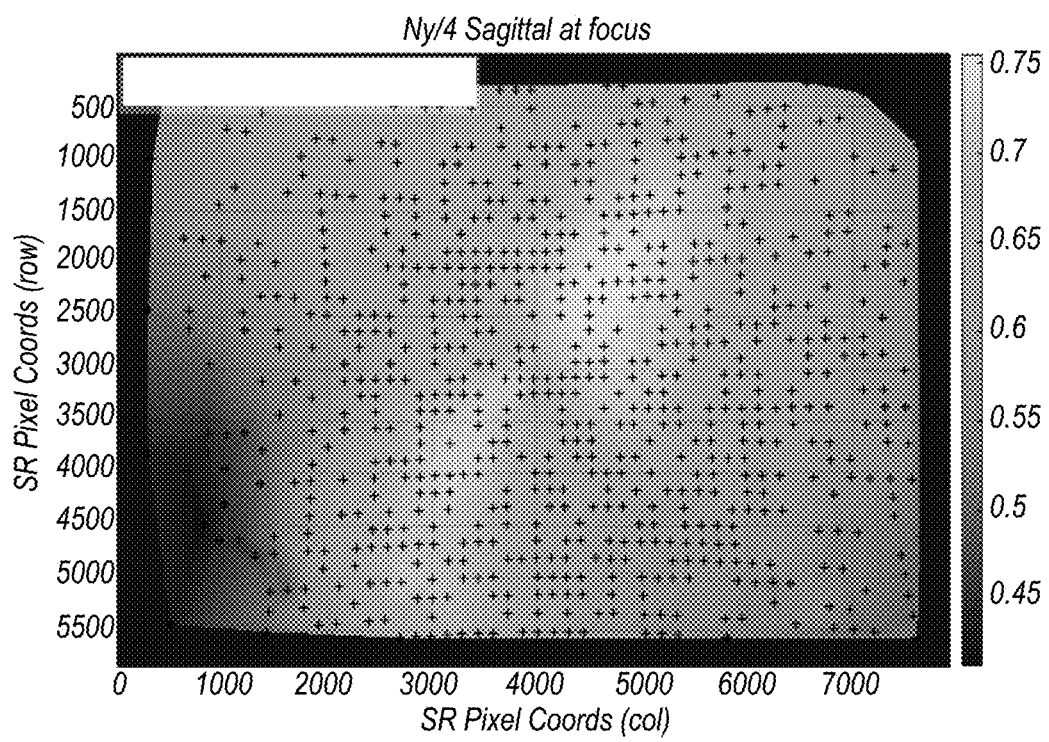
FIG. 19B depicts an image representation of sagittal plane SFR scores determined at Nyquist/4 from recovered optical fields.
Figure 20A:
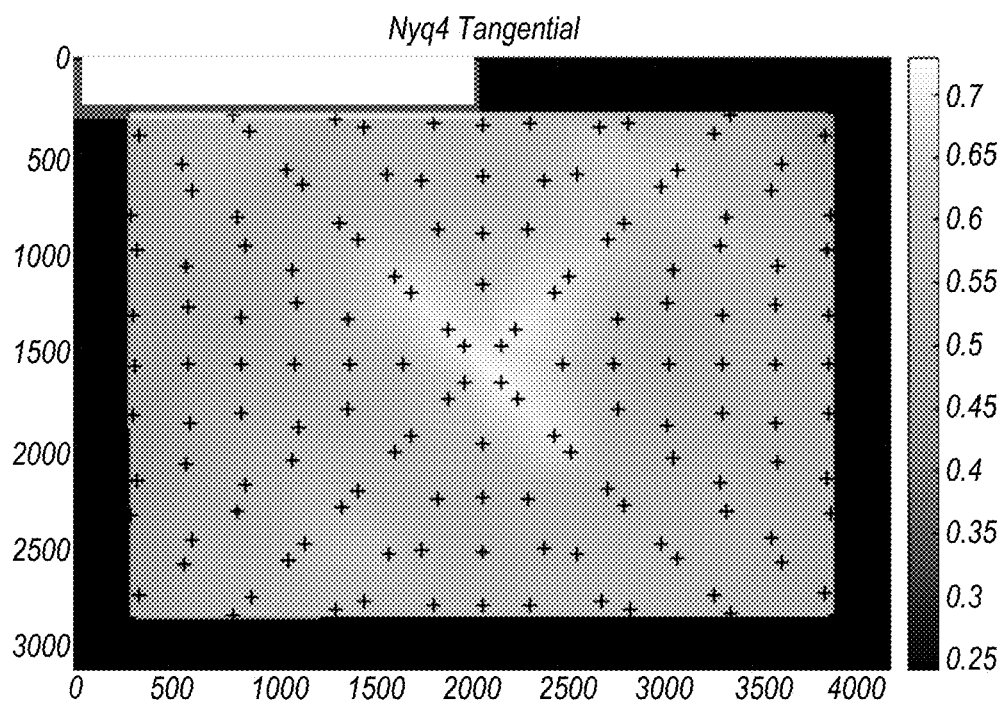
FIG. 20A depicts an image representation of tangential plane SFR scores determined at Nyquist/4 using the circle SFR method.
Figure 20B:
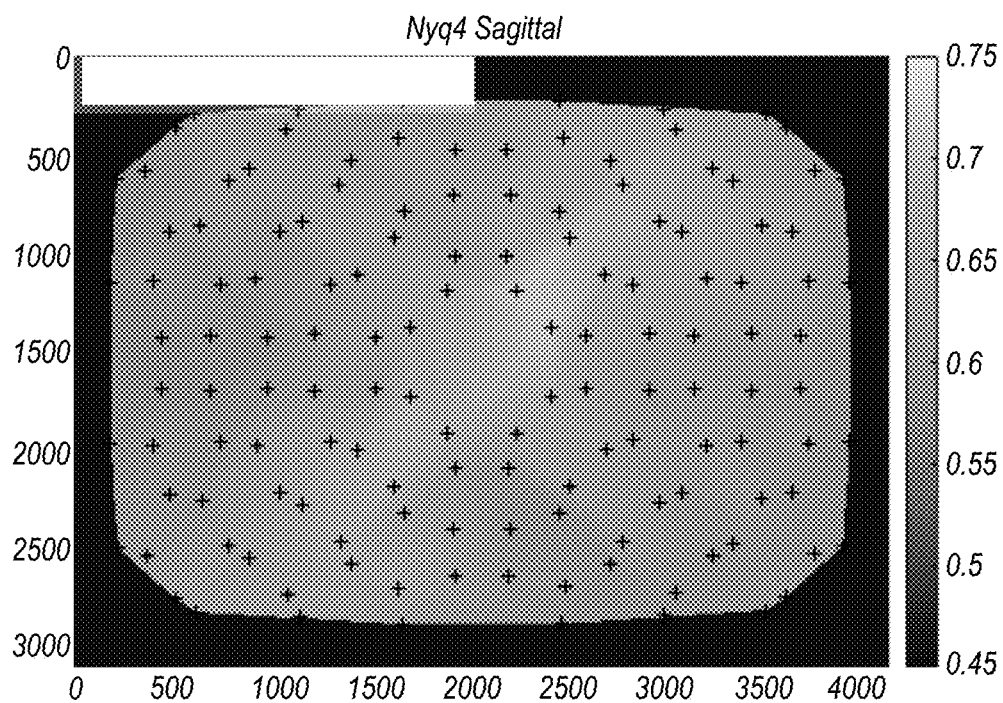
FIG. 20B depicts an image representation of sagittal plane SFR scores determined at Nyquist/4 using the circle SFR method.

FIG. 19A depicts an image representation of tangential plane SFR scores determined at Nyquist over 4 (Nyquist/4) from recovered optical fields using method 900 for the example camera system. FIG. 19B depicts an image representation of sagittal plane SFR scores determined at Nyquist/4 from recovered optical fields using method 900 for the example camera system. FIG. 20A depicts an image representation of tangential plane SFR scores determined at Nyquist/4 using the circle SFR method for the example camera system. FIG. 20B depicts an image representation of sagittal plane SFR scores determined at Nyquist/4 using the circle SFR method for the example camera system.

As shown in FIGS. 17A and 17B and FIGS. 19A and 19B, the SFR scores determined by method 900 have increased resolution of the SFR versus the SFR scores determined by the circle SFR method, shown in FIGS. 18A and 18B and FIGS. 20A and 20B. Thus, recovering the optical fields using method 900 and generating SFR scores from the recovered optical fields generates a better representation of SFR across image sensor 202 than the circle SFR method. The optical fields recovered using method 900 may be utilized to extract other intrinsic parameters for camera 102 (e.g., calibration data) that can be utilized to improve image quality from the camera. Examples of other intrinsic parameters (e.g., intrinsic calibration data) include, but are not limited to, modulation transfer function (MTF), field curvature, optical magnification, lens blur, lens sharpness, lens-to-sensor aliasing, chroma and luma aliasing, color-channel dependencies, axial and lateral chromatic aberrations, additional point spread functions, additional measures of optical aberration, additional measures of optical distortion, and combinations thereof. In some embodiments, method 900 may be implemented in a multi-camera system to determine extrinsic parameters (e.g., extrinsic calibration data such as relative position and tilt between the cameras) using the recovered optical fields.

Figure 21:
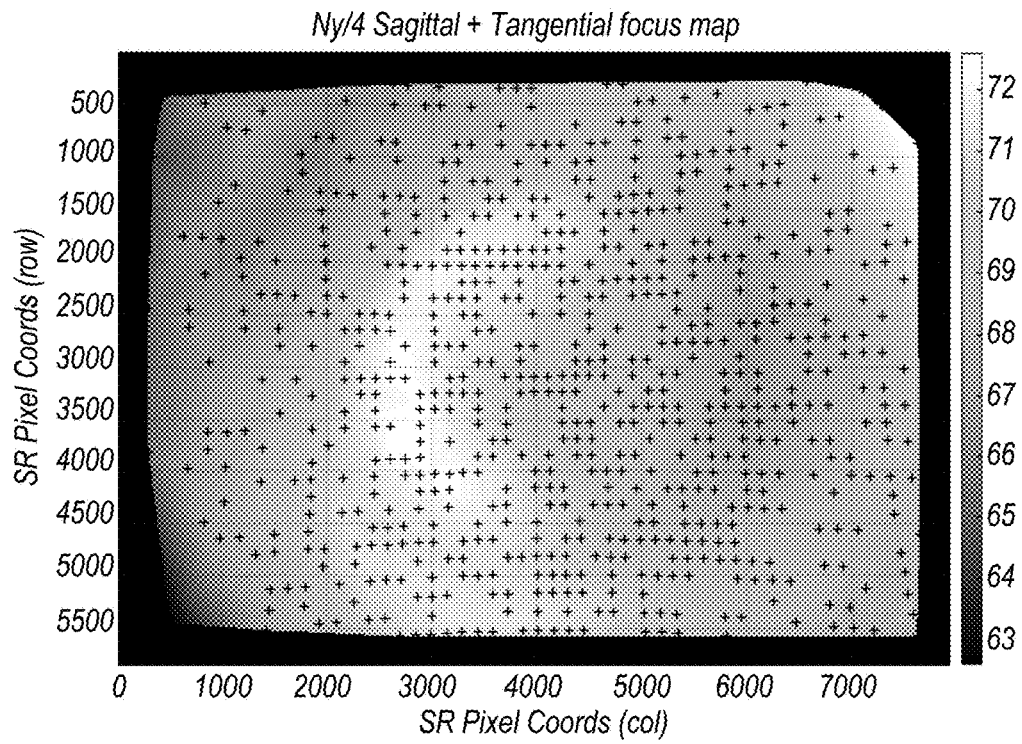
FIG. 21 depicts an image representation of a focus map for combined tangential and sagittal planes determined at Nyquist/4 from recovered optical fields.

Turning back to FIG. 9, in some embodiments, field curvature is extracted from the recovered optical fields at 912. Extracting the field curvature from the recovered optical fields may include, for example, extracting the best focus positions from the recovered optical fields using Fourier transforms or other techniques. FIG. 21 depicts an image representation of a focus map for combined tangential and sagittal planes determined at Nyquist/4 from recovered optical fields using method 900 for the example camera system. Map 2100 is an example of a map generated for the best focus positions similar to the example maps depicted in FIGS. 7 and 8. Map 2100 includes best focus positions that are determined separately for the tangential plane and the sagittal plane and combined on the map. Map 2100 corresponds to the field curvature of lenses 200 for both the tangential and sagittal planes to provide a physical measurement/characterization (e.g., calibration data) of the actual field curvature for lenses 200 in camera 102.

Returning to FIG. 2, as described above, circuitry 204 may implement calibration data (e.g., parameters or properties) for camera 102 (e.g., the combination of lenses 200 and image sensor 202) to generate better quality images using the camera. The calibration data may include data generated from method 500 or method 900, as described herein. For example, the calibration data may include field curvature data or SFR data for camera 102. In certain embodiments, the calibration data is generated during or after manufacturing camera 102 using calibration system 300 (shown in FIG. 3). The calibration data may then be saved in device 100 or camera 102 (e.g., in memory coupled to circuitry 204) to be implemented as predetermined parameters (properties) during operation of the device.

Figure 22:
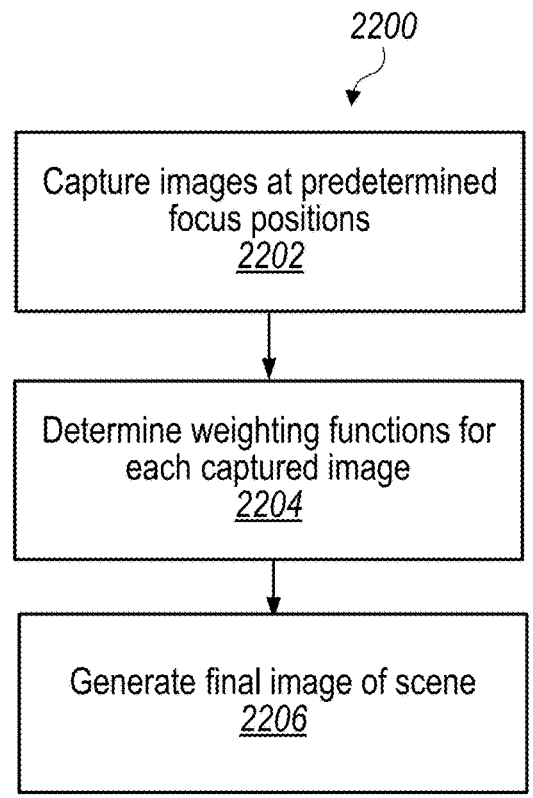
FIG. 22 depicts a flow diagram illustrating a method for generating an image using calibration data for a camera, according to some embodiments.

In certain embodiments, calibration data is utilized in a super-resolution image fusion method to generate a higher quality image from multiple images captured at different focus positions by camera 102. For example, circuitry 204 in camera 102 may combine field curvature data, SFR data, additional intrinsic calibration data, extrinsic calibration data, or combinations thereof into a super-resolution image fusion method to generate a higher quality image from multiple images captured at predetermined focus positions by camera 102. FIG. 22 depicts a flow diagram illustrating method 2200 for generating an image using calibration data for camera 102, according to some embodiments. In some embodiments, method 2200 is, or is part of, a super-resolution image fusion method.

At 2202, camera 102 captures multiple images of a scene attempting to be photographed by a user of device 100. The multiple captured images include a set of images where each image is captured at a different predetermined focus position (e.g., different predetermined focus positions specified in a set of predetermined focus positions). For example, a first image is captured at a first predetermined focus position, a second image is captured at a second predetermined focus position, a third image is captured at a third predetermined focus position, etc. The set of predetermined focus positions may be determined during manufacturing or programming of device 100.

At 2204, weighting functions are determined for each captured image in the set of images. In certain embodiments, determining the weighting functions includes determining weights to be applied to values of pixels in a captured image. The pixels in the captured images correspond to pixel sensors across image sensor 202. Thus, for each pixel sensor on image sensor 202, the determined weights may be applied to determine weighted values for the corresponding pixels in each captured image. The weighted values may then be used in combining pixel data from the images to generate an output pixel for a final image in 2206, described below.

In certain embodiments, in 2204, the weighting functions are determined based on the calibration data for camera 102 in combination with the predetermined focus positions. For example, in some embodiments, the weighting functions may be based on field curvature data for lenses 200 and the predetermined focus positions. The field curvature data used for determining the weighting functions may include field curvature of lenses 200 in both the tangential and sagittal planes, as described herein. In some embodiments, the weighting functions are based on SFR score data and the predetermined focus positions. SFR score data used in determining the weighting functions may include SFR scores for both the tangential and sagittal planes, as described herein.

In some embodiments, weighting functions are determined based on multiple calibration data. For example, both field curvature data and SFR score data may be used in determining the weighting functions. In some embodiments, weighting functions are determined based on calibration data and predetermined focus positions in combination with properties assessed in the images. For example, image-shift (e.g., homography) and color channel may be used in combination with calibration data and predetermined focus positions to determine the weighting functions.

After the weighting functions are determined, a final image of the scene may be generated at 2206. The final image may be generated by combining data from the multiple images based on the weighting functions determined for each of the captured images. In certain embodiments, the final image is generated by combining pixel data from the images according to the weighted values of the pixels to determine output pixels for the final image. In some embodiments, the output pixels are generated by a sum combination of the weighted values of the pixels in the captured images. In some embodiments, the output pixels are generated by a more complex combination of the weighted values of the pixels in the captured images.

The final image may be, for example, a multi-image super-resolution image. Generating the final image using the calibration data may improve the quality of the final image as the calibration data provides characterization of actual physical properties of camera 102. For example, field curvature data may improve focusing for the final image by providing more accuracy in determining best focus positions in the captured images. The final image may also have improved sharpness by using SFR score data generated from recovered optical fields.

In some embodiments, calibration data may be implemented prior to capturing images to capture images in better quality. For example, calibration data may be used to determine operating properties of camera 102 before the camera is used to capture images. Operating properties of camera 102 that may be determined include, but are not limited to, focus positions, focus modes, exposure settings, aperture settings, shutter speed settings, and ISO settings. The operating properties may be determined based on calibration data such as field curvature data (e.g., for focus positions and focus modes) and SFR score data (e.g., for aperture settings and shutter speed settings).

In some embodiments, calibration data is combined with other camera-related data to determine operating properties of camera 102. For example, depth information determined by a depth sensor on camera 102 or device 100 may be used in combination with calibration data to determine operating properties of camera 102. The depth sensor may include, but not be limited to, a structured light depth sensor, a time-of-flight sensor, or a stereo sensor. In certain embodiments, depth information from the depth sensor is used in combination with field curvature data to set focus positions for camera 102.

In one embodiment, the depth information in combination with the field curvature data may, for example, be used to create a specific focus sweep to be implemented by camera 102. The specific focus sweep may include focus positions that are known to capture best focus of one or more depths determined for a scene to be captured. The focus sweep could then bring every depth in the scene in focus. In another embodiment, knowing the field curvature and the depth in the scene, the images captured during a focus sweep that are best in focus for each pixel in the images is already known and the correct images may be selected for fusion of the images based on this information. In some embodiments, calibration data is used in camera 102 to provide specific modes for the camera. For example, to create portrait mode pictures, the field curvature data may be used to apply proper portrait mode blur to the images.

Figure 23:
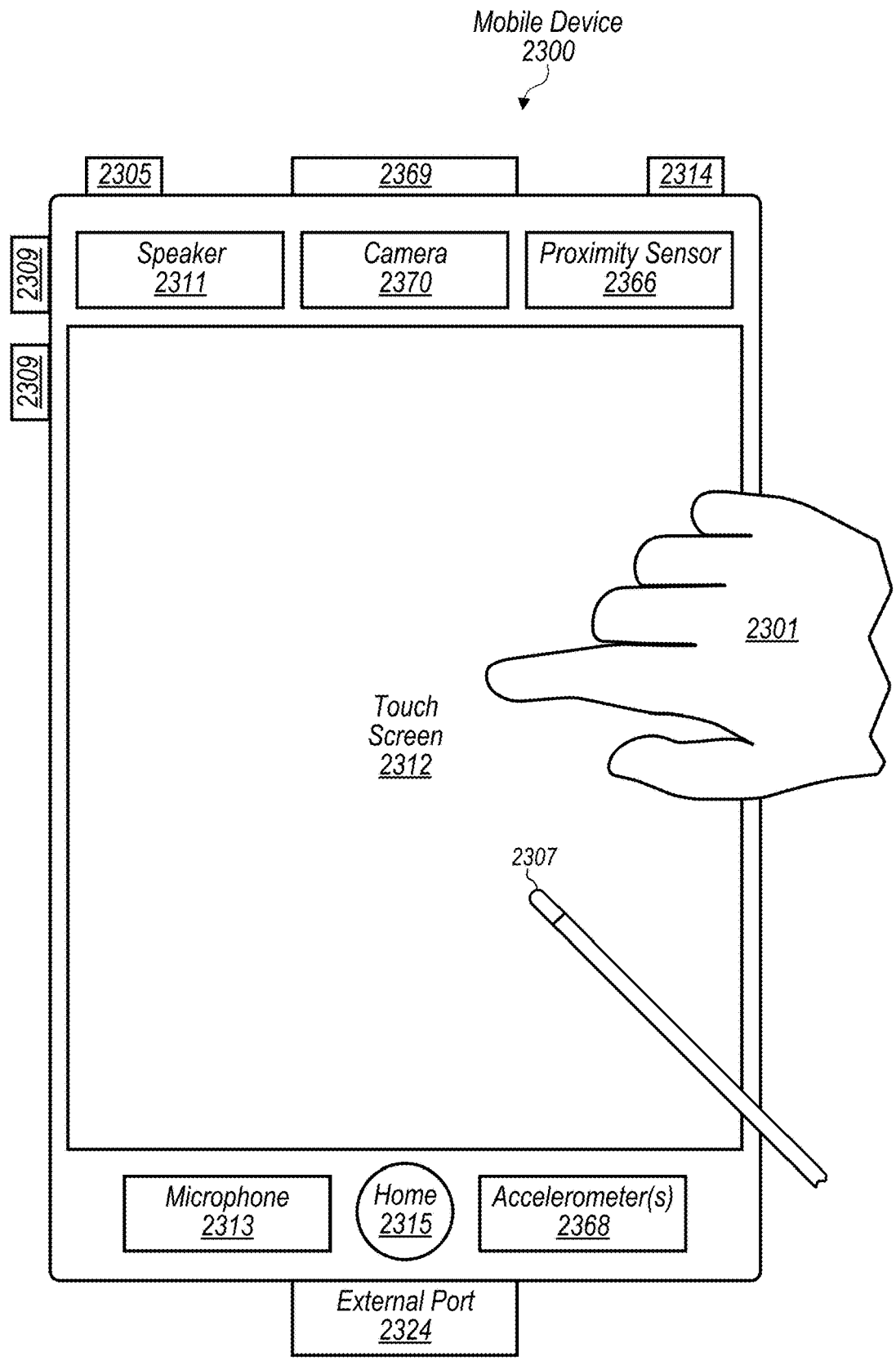
FIG. 23 illustrates a "front" side of a mobile device.
Figure 24:
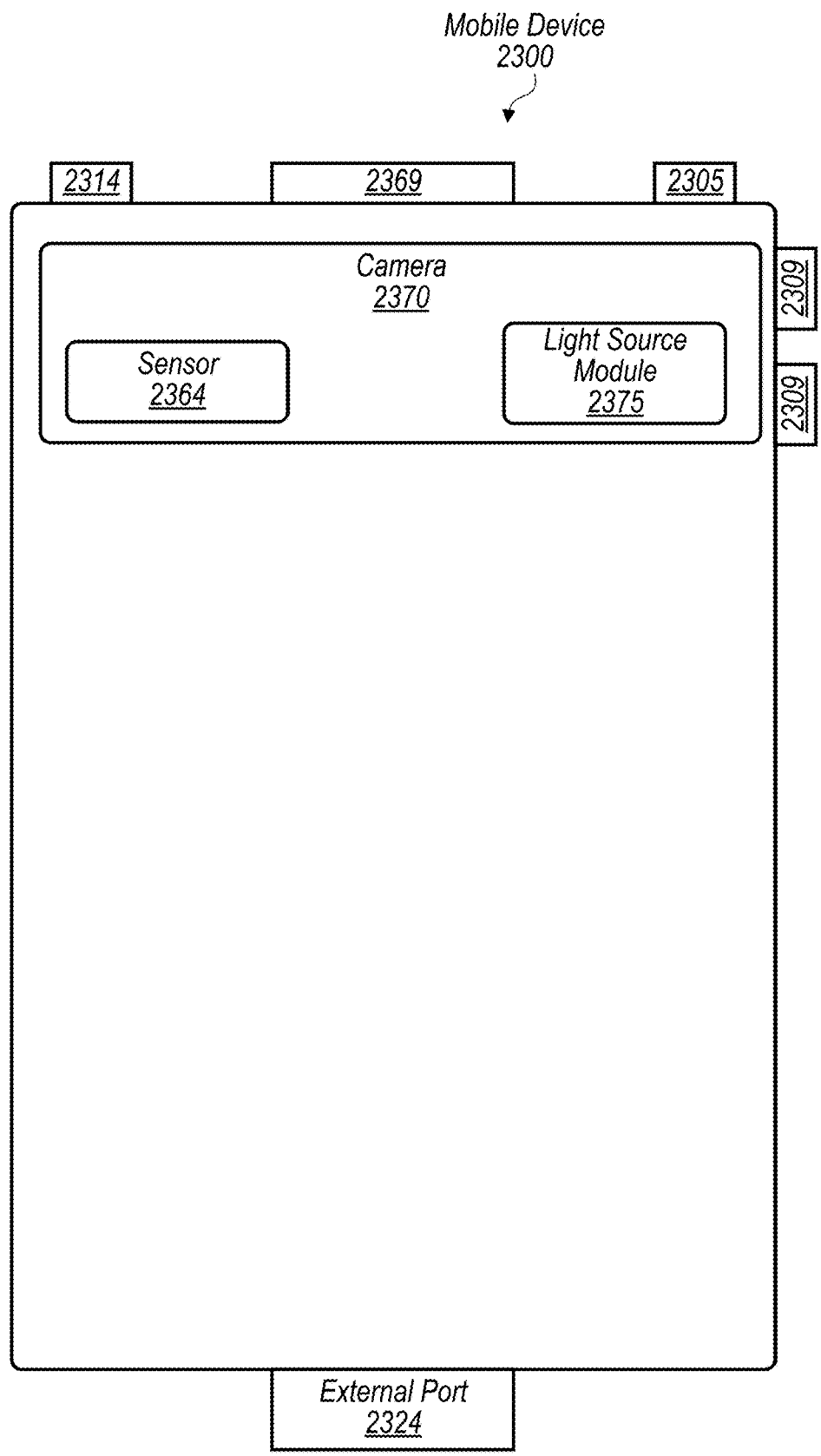
FIG. 24 illustrates a "rear" side of a mobile device.
Figure 25:
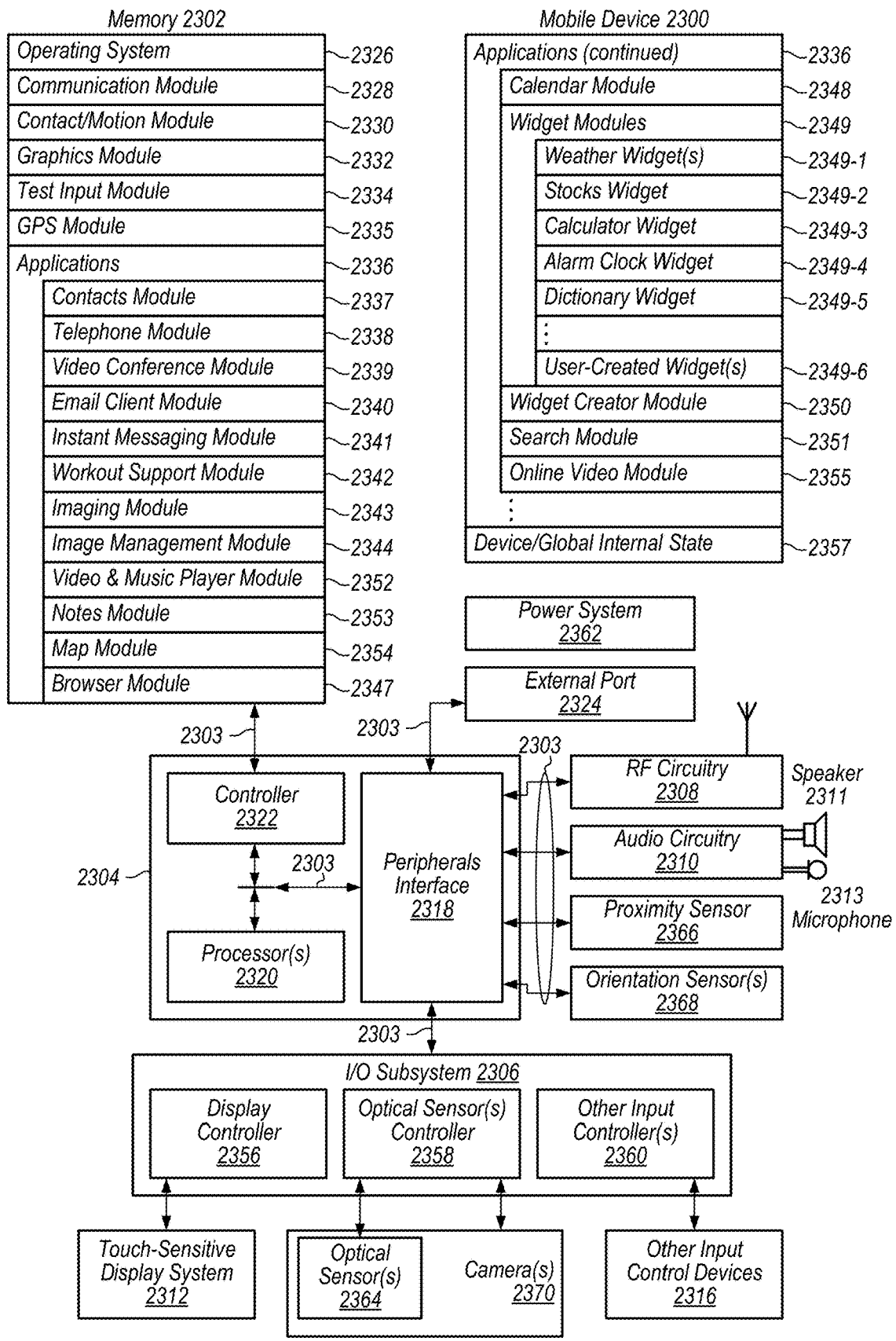
FIG. 25 illustrates a block diagram of a mobile device.

FIGS. 23-25 illustrate embodiments of mobile device 2300 that may include one or more cameras, in accordance with embodiments as described above. In some embodiments, device 2300 may include one or multiple features, components, and/or functionality of embodiments described herein.

FIG. 23 illustrates that a "front" side of device 2300 may have touch screen 2312. Touch screen 2312 may display one or more graphics within a user interface (UI). In this embodiment, as well as others described below, a user may select one or more of the graphics by making a gesture on the graphics, for example, with one or more fingers 2301 (not drawn to scale in the figure) or one or more styluses 2307 (not drawn to scale in the figure).

Device 2300 may also include one or more physical buttons, such as "home" or menu button 2315, which may be used to navigate to any application 2336 (see FIG. 25) in a set of applications that may be executed on device 2300. Alternatively, in some embodiments, the menu button is implemented as a soft key in a graphics user interface (GUI) displayed on touch screen 2312.

In one embodiment, device 2300 includes touch screen 2312, menu button 2315, push button 2305 for powering the device on/off and locking the device, volume adjustment button(s) 2309, Subscriber Identity Module (SIM) card slot 2369, head set jack 2314, and docking/charging external port 2324, in accordance with some embodiments. Push button 2305 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 2300 also may accept verbal input for activation or deactivation of some functions through microphone 2313.

FIG. 23 illustrates that the "front" side of device 2300 may include camera 2370, in accordance with some embodiments. FIG. 24 illustrates that a "rear" side of device 2300 may include camera 2370, in accordance with some embodiments. Camera 2370, which may be referred to as an "optical sensor" for convenience, may also be known as or called an optical sensor system. Camera 2370 may include one or more camera modules. FIG. 24 further illustrates camera 2370 includes optical sensor 2364 and light source module 2375. Light source module 2375 may include, for example, one or more internal strobes.

Referring to FIG. 25, a block diagram illustrates that device 2300 may include memory 2302 (which may include one or more computer readable storage mediums), memory controller 2322, one or more processing units (CPU's) 2320, peripherals interface 2318, RF circuitry 2308, audio circuitry 2310, speaker 2311, touch-sensitive display system 2312, microphone 2313, input/output (I/O) subsystem 2306, other input control devices 2316, and external port 2324. Device 2300 may include one or more optical sensors 2364. These components may communicate over one or more communication buses or signal lines 2303.

It should be appreciated that device 2300 is only one example of a portable multifunction device, and that device 2300 may have more or fewer components than shown, may combine two or more components, or may have a different configuration or arrangement of the components. The various components shown in FIG. 25 may be implemented in hardware, software, or a combination of hardware and software, including one or more signal processing and/or application specific integrated circuits.

Memory 2302 may include high-speed random access memory and may also include non-volatile memory, such as one or more magnetic disk storage devices, flash memory devices, or other non-volatile solid-state memory devices. Access to memory 2302 by other components of device 2300, such as CPU 2320 and the peripherals interface 2318, may be controlled by memory controller 2322.

Peripherals interface 2318 can be used to couple input and output peripherals of the device to CPU 2320 and memory 2302. The one or more processors 2320 run or execute various software programs and/or sets of instructions stored in memory 2302 to perform various functions for device 2300 and to process data.

In some embodiments, peripherals interface 2318, CPU 2320, and memory controller 2322 may be implemented on a single chip, such as chip 2304. In some other embodiments, they may be implemented on separate chips.

RF (radio frequency) circuitry 2308 receives and sends RF signals, also called electromagnetic signals. RF circuitry 2308 converts electrical signals to/from electromagnetic signals and communicates with communications networks and other communications devices via the electromagnetic signals. RF circuitry 2308 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 2308 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 2310, speaker 2311, and microphone 2313 provide an audio interface between a user and device 2300. Audio circuitry 2310 receives audio data from peripherals interface 2318, converts the audio data to an electrical signal, and transmits the electrical signal to speaker 2311. Speaker 2311 converts the electrical signal to human-audible sound waves. Audio circuitry 2310 also receives electrical signals converted by microphone 2313 from sound waves. Audio circuitry 2310 converts the electrical signal to audio data and transmits the audio data to peripherals interface 2318 for processing. Audio data may be retrieved from and/or transmitted to memory 2302 and/or RF circuitry 2308 by peripherals interface 2318. In some embodiments, audio circuitry 2310 also includes a headset jack (e.g., 2314, FIGS. 23-24). The headset jack provides an interface between audio circuitry 2310 and removable audio input/output peripherals, such as output-only headphones or a headset with both output (e.g., a headphone for one or both ears) and input (e.g., a microphone).

I/O subsystem 2306 couples input/output peripherals on device 2300, such as touch screen 2312 and other input control devices 2316, to peripherals interface 2318. I/O subsystem 2306 may include display controller 2356 and one or more input controllers 2360 for other input or control devices. The one or more input controllers 2316 receive/send electrical signals from/to other input or control devices 2316. The other input control devices 2316 may include physical buttons (e.g., push buttons, rocker buttons, etc.), dials, slider switches, joysticks, click wheels, and so forth. In some alternative embodiments, input controller(s) 2360 may be coupled to any (or none) of the following: a keyboard, infrared port, USB port, and a pointer device such as a mouse. The one or more buttons (e.g., 2309, FIGS. 23-24) may include an up/down button for volume control of speaker 2311 and/or microphone 2313. The one or more buttons may include a push button (e.g., 2306, FIGS. 23-24).

Touch-sensitive display 2312 provides an input interface and an output interface between the device and a user. Display controller 2356 receives and/or sends electrical signals from/to touch screen 2312. Touch screen 2312 displays visual output to the user. The visual output may include graphics, text, icons, video, and any combination thereof (collectively termed "graphics"). In some embodiments, some or all of the visual output may correspond to user-interface objects.

Touch screen 2312 has a touch-sensitive surface, sensor or set of sensors that accepts input from the user based on haptic and/or tactile contact. Touch screen 2312 and display controller 2356 (along with any associated modules and/or sets of instructions in memory 2302) detect contact (and any movement or breaking of the contact) on touch screen 2312 and converts the detected contact into interaction with user-interface objects (e.g., one or more soft keys, icons, web pages or images) that are displayed on touch screen 2312. In an example embodiment, a point of contact between touch screen 2312 and the user corresponds to a finger of the user.

Touch screen 2312 may use LCD (liquid crystal display) technology, LPD (light emitting polymer display) technology, or LED (light emitting diode) technology, although other display technologies may be used in other embodiments. Touch screen 2312 and display controller 2356 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 2312. In an example embodiment, projected mutual capacitance sensing technology may be used.

Touch screen 2312 may have a video resolution in excess of 100 dots per inch (dpi). In some embodiments, the touch screen has a video resolution of approximately 160 dpi. The user may make contact with touch screen 2312 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 2300 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 2312 or an extension of the touch-sensitive surface formed by the touch screen.

Device 2300 also includes power system 2362 for powering the various components. Power system 2362 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

As described herein, device 2300 may include one or more cameras 2370 that include optical sensors 2364. FIG. 25 shows optical sensor 2364 coupled to optical sensor controller 2358 in I/O subsystem 2306. Optical sensor 2364 may include charge-coupled device (CCD) or complementary metal-oxide semiconductor (CMOS) phototransistors. Optical sensor 2364 receives light from the environment, projected through one or more lens, and converts the light to data representing an image. In conjunction with camera(s) 2370 (such as an embodiment of a camera described herein), optical sensor 2364 may capture still images or video. In some embodiments, an optical sensor is located on the back of device 2300, opposite touch screen display 2312 on the front of the device, so that the touch screen display may be used as a viewfinder for still and/or video image acquisition. In some embodiments, another optical sensor is located on the front of the device so that the user's image may be obtained for processing on the device (e.g., facial recognition processing) or for videoconferencing while the user views the other videoconference participants on the touch screen display.

Device 2300 may also include one or more proximity sensors 2366. FIG. 25 shows proximity sensor 2366 coupled to peripherals interface 2318. Alternatively, proximity sensor 2366 may be coupled to input controller 2360 in I/O subsystem 2306. In some embodiments, the proximity sensor turns off and disables touch screen 2312 when the multifunction device is placed near the user's ear (e.g., when the user is making a phone call).

Device 2300 includes one or more orientation sensors 2368. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 2300. In some embodiments, the one or more orientation sensors include any combination of orientation/rotation sensors. FIG. 25 shows the one or more orientation sensors 2368 coupled to peripherals interface 2318. Alternatively, the one or more orientation sensors 2368 may be coupled to an input controller 2360 in I/O subsystem 2306. In some embodiments, information is displayed on the touch screen display in a portrait view or a landscape view based on an analysis of data received from the one or more orientation sensors.

In some embodiments, the software components stored in memory 2302 include operating system 2326, communication module (or set of instructions) 2328, instructions). Furthermore, in some embodiments, memory 2302 stores device/global internal state, including information obtained from the device's various sensors and input control devices 2316; and location information concerning the device's location and/or attitude.

Operating system 2326 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 2328 facilitates communication with other devices over one or more external ports 2324 and also includes various software components for handling data received by RF circuitry 2308 and/or external port 2324. External port 2324 (e.g., Universal Serial Bus (USB), FIRE-WIRE, etc.) is adapted for coupling directly to other devices, in accordance with some embodiments, or indirectly over a network (e.g., the Internet, wireless LAN, etc.).

Contact/motion module 2330 may detect contact with touch screen 2312 (in conjunction with display controller 2356) and other touch sensitive devices (e.g., a touchpad or physical click wheel). Contact/motion module 2330 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 2330 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 2330 and display controller 2356 detect contact on a touchpad.

Contact/motion module 2330 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 2332 includes various known software components for rendering and displaying graphics on touch screen 2312 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 2332 stores data representing graphics to be used. Each graphic may be assigned a corresponding code. Graphics module 2332 receives, from applications etc., one or more codes specifying graphics to be displayed along with, if necessary, coordinate data and other graphic property data, and then generates screen image data to output to display controller 2356.

Text input module 2334, which may be a component of graphics module 2332, provides soft keyboards for entering text in various applications (e.g., contacts 2337, e-mail 2340, IM 2341, browser 2347, and any other application that needs text input).

GPS module 2335 determines the location of the device and provides this information for use in various applications (e.g., to telephone 2338 for use in location-based dialing, to imaging module 2343 as picture/video metadata, and to applications that provide location-based services such as weather widgets, local yellow page widgets, and map/navigation widgets).

Applications 2336 may include the following modules (or sets of instructions), or a subset or superset thereof:
- contacts module 2337 (sometimes called an address book or contact list);
- telephone module 2338;
- video conferencing module 2339;
- e-mail client module 2340;
- instant messaging (IM) module 2341;
- workout support module 2342;
- camera module 2343 for still and/or video images;
- image management module 2344;
- browser module 2347;
- calendar module 2348;
- widget modules 2349, which may include one or more of: weather widget 2349-1, stocks widget 2349-2, calculator widget 2349-3, alarm clock widget 2349-4, dictionary widget 2349-5, and other widgets obtained by the user, as well as user-created widgets 2349-6;
- widget creator module 2350 for making user-created widgets 2349-6;
- search module 2351;
- video and music player module 2352, which may be made up of a video player module and a music player module;
- notes module 2353;
- map module 2354; and/or online video module 2355.

Examples of other applications 2336 that may be stored in memory 2302 include other word processing applications, other image editing applications, drawing applications, presentation applications, JAVA-enabled applications, encryption, digital rights management, voice recognition, and voice replication.

In conjunction with touch screen 2312, display controller 2356, contact module 2330, graphics module 2332, and text input module 2334, contacts module 2337 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 2338, video conference 2339, e-mail 2340, or IM 2341; and so forth.

In conjunction with RF circuitry 2308, audio circuitry 2310, speaker 2311, microphone 2313, touch screen 2312, display controller 2356, contact module 2330, graphics module 2332, and text input module 2334, telephone module 2338 may be used to enter a sequence of characters corresponding to a telephone number, access one or more telephone numbers in address book 2337, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 2308, audio circuitry 2310, speaker 2311, microphone 2313, touch screen 2312, display controller 2356, optical sensor 2364, optical sensor controller 2358, contact module 2330, graphics module 2332, text input module 2334, contact list 2337, and telephone module 2338, videoconferencing module 2339 includes executable instructions to initiate, conduct, and terminate a video conference between a user and one or more other participants in accordance with user instructions.

In conjunction with RF circuitry 2308, touch screen 2312, display controller 2356, contact module 2330, graphics module 2332, and text input module 2334, e-mail client module 2340 includes executable instructions to create, send, receive, and manage e-mail in response to user instructions. In conjunction with image management module 2344, e-mail client module 2340 makes it very easy to create and send e-mails with still or video images taken by imaging module 2343.

In conjunction with RF circuitry 2308, touch screen 2312, display controller 2356, contact module 2330, graphics module 2332, and text input module 2334, the instant messaging module 2341 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 2308, touch screen 2312, display controller 2356, contact module 2330, graphics module 2332, text input module 2334, GPS module 2335, map module 2354, and music player module 2346, workout support module 2342 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 2312, display controller 2356, optical sensor(s) 2364, camera(s) 2370, optical sensor controller 2358, light source module 2375 (see FIG. 24), contact module 2330, graphics module 2332, and image management module 2344, imaging module 2343 includes executable instructions to capture still images or video (including a video stream) and store them into memory 2302, modify characteristics of a still image or video, or delete a still image or video from memory 2302.

In conjunction with touch screen 2312, display controller 2356, optical sensor(s) 2364, camera(s) 2370, contact module 2330, graphics module 2332, text input module 2334, light source module 2375 (see FIG. 24), and imaging module 2343, image management module 2344 includes executable instructions to arrange, modify (e.g., edit), or otherwise manipulate, label, delete, present (e.g., in a digital slide show or album), and store still and/or video images.

In conjunction with RF circuitry 2308, touch screen 2312, display system controller 2356, contact module 2330, graphics module 2332, and text input module 2334, browser module 2347 includes executable instructions to browse the Internet in accordance with user instructions, including searching, linking to, receiving, and displaying web pages or portions thereof, as well as attachments and other files linked to web pages.

In conjunction with RF circuitry 2308, touch screen 2312, display system controller 2356, contact module 2330, graphics module 2332, text input module 2334, e-mail client module 2340, and browser module 2347, calendar module 2348 includes executable instructions to create, display, modify, and store calendars and data associated with calendars (e.g., calendar entries, to do lists, etc.) in accordance with user instructions.

In conjunction with RF circuitry 2308, touch screen 2312, display system controller 2356, contact module 2330, graphics module 2332, text input module 2334, and browser module 2347, widget modules 2349 are mini-applications that may be downloaded and used by a user (e.g., weather widget 2349-1, stocks widget 2349-2, calculator widget 2349-3, alarm clock widget 2349-4, and dictionary widget 2349-5) or created by the user (e.g., user-created widget 2349-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 2308, touch screen 2312, display system controller 2356, contact module 2330, graphics module 2332, text input module 2334, and browser module 2347, the widget creator module 2350 may be used by a user to create widgets (e.g., turning a user-specified portion of a web page into a widget).

In conjunction with touch screen 2312, display system controller 2356, contact module 2330, graphics module 2332, and text input module 2334, search module 2351 includes executable instructions to search for text, music, sound, image, video, and/or other files in memory 2302 that match one or more search criteria (e.g., one or more user-specified search terms) in accordance with user instructions.

In conjunction with touch screen 2312, display system controller 2356, contact module 2330, graphics module 2332, audio circuitry 2310, speaker 2311, RF circuitry 2308, and browser module 2347, video and music player module 2352 includes executable instructions that allow the user to download and play back recorded music and other sound files stored in one or more file formats, such as MP3 or AAC files, and executable instructions to display, present or otherwise play back videos (e.g., on touch screen 2312 or on an external, connected display via external port 2324). In some embodiments, device 2300 may include the functionality of an MP3 player.

In conjunction with touch screen 2312, display controller 2356, contact module 2330, graphics module 2332, and text input module 2334, notes module 2353 includes executable instructions to create and manage notes, to do lists, and the like in accordance with user instructions.

In conjunction with RF circuitry 2308, touch screen 2312, display system controller 2356, contact module 2330, graphics module 2332, text input module 2334, GPS module 2335, and browser module 2347, map module 2354 may be used to receive, display, modify, and store maps and data associated with maps (e.g., driving directions; data on stores and other points of interest at or near a particular location; and other location-based data) in accordance with user instructions.

In conjunction with touch screen 2312, display system controller 2356, contact module 2330, graphics module 2332, audio circuitry 2310, speaker 2311, RF circuitry 2308, text input module 2334, e-mail client module 2340, and browser module 2347, online video module 2355 includes instructions that allow the user to access, browse, receive (e.g., by streaming and/or download), play back (e.g., on the touch screen or on an external, connected display via external port 2324), send an e-mail with a link to a particular online video, and otherwise manage online videos in one or more file formats, such as H.264. In some embodiments, instant messaging module 2341, rather than e-mail client module 2340, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 2302 may store a subset of the modules and data structures identified above. Furthermore, memory 2302 may store additional modules and data structures not described above.

In some embodiments, device 2300 is a device where operation of a predefined set of functions on the device is performed exclusively through a touch screen and/or a touchpad. By using a touch screen and/or a touchpad as the primary input control device for operation of device 2300, the number of physical input control devices (such as push buttons, dials, and the like) on device 2300 may be reduced.

The predefined set of functions that may be performed exclusively through a touch screen and/or a touchpad include navigation between user interfaces. In some embodiments, the touchpad, when touched by the user, navigates device 2300 to a main, home, or root menu from any user interface that may be displayed on device 2300. In such embodiments, the touchpad may be referred to as a "menu button." In some other embodiments, the menu button may be a physical push button or other physical input control device instead of a touchpad.

Example Computing Device

Figure 26:
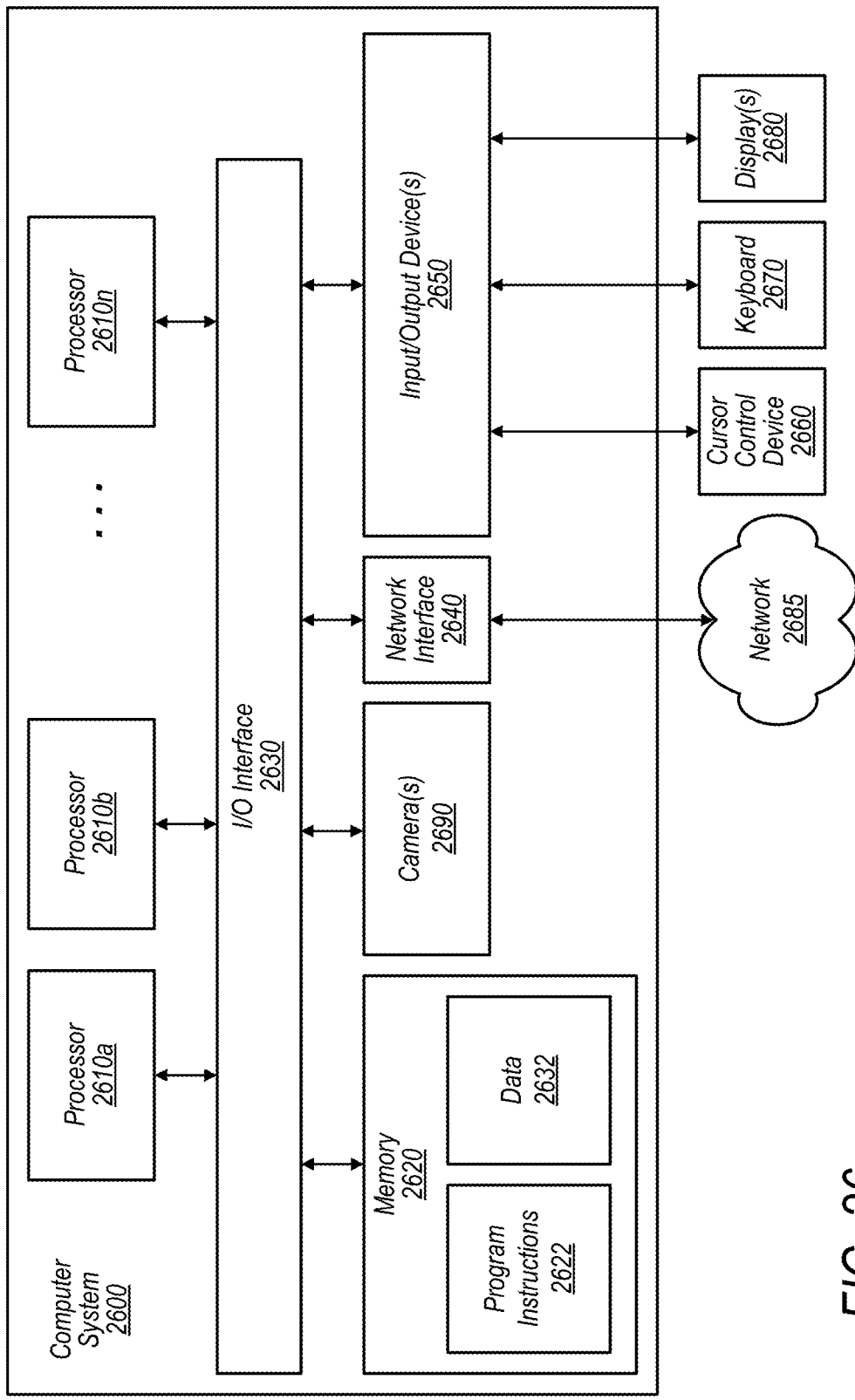
FIG. 26 illustrates an example computing device.

FIG. 26 illustrates an example computing device, referred to as computer system 2600, that may include or host embodiments of a camera as illustrated in FIGS. 1-3. In addition, computer system 2600 may implement methods for controlling operations of the camera and/or for performing image processing of images captured with the camera. In different embodiments, computer system 2600 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2600 includes one or more processors 2610 coupled to a system memory 2620 via an input/output (I/O) interface 2630. Computer system 2600 further includes a network interface 2640 coupled to I/O interface 2630, and one or more input/output devices 2650, such as cursor control device 2660, keyboard 2670, and display(s) 2680. Computer system 2600 may also include one or more cameras 2690, for example one or more cameras as described above with respect to FIGS. 1-3, which may also be coupled to I/O interface 2630, or one or more cameras as described above with respect to FIGS. 1-3 along with one or more other cameras.

In various embodiments, computer system 2600 may be a uniprocessor system including one processor 2610, or a multiprocessor system including several processors 2610 (e.g., two, four, eight, or another suitable number). Processors 2610 may be any suitable processor capable of executing instructions. For example, in various embodiments processors 2610 may be general-purpose or embedded processors implementing any of a variety of instruction set architectures (ISAs), such as the x86, PowerPC, SPARC, or MIPS ISAs, or any other suitable ISA. In multiprocessor systems, each of processors 2610 may commonly, but not necessarily, implement the same ISA.

System memory 2620 may be configured to store program instructions 2622 and/or data 2632 accessible by processor 2610. In various embodiments, system memory 2620 may be implemented using any suitable memory technology, such as static random access memory (SRAM), synchronous dynamic RAM (SDRAM), nonvolatile/Flash-type memory, or any other type of memory. In the illustrated embodiment, program instructions 2622 may be configured to implement various interfaces, methods and/or data for controlling operations of camera 2690 and for capturing and processing images with integrated camera 2690 or other methods or data, for example interfaces and methods for capturing, displaying, processing, and storing images captured with camera 2690. In some embodiments, program instructions and/or data may be received, sent or stored upon different types of computer-accessible media or on similar media separate from system memory 2620 or computer system 2600.

In one embodiment, I/O interface 2630 may be configured to coordinate I/O traffic between processor 2610, system memory 2620, and any peripheral devices in the device, including network interface 2640 or other peripheral interfaces, such as input/output devices 2650. In some embodiments, I/O interface 2630 may perform any necessary protocol, timing or other data transformations to convert data signals from one component (e.g., system memory 2620) into a format suitable for use by another component (e.g., processor 2610). In some embodiments, I/O interface 2630 may include support for devices attached through various types of peripheral buses, such as a variant of the Peripheral Component Interconnect (PCI) bus standard or the Universal Serial Bus (USB) standard, for example. In some embodiments, the function of I/O interface 2630 may be split into two or more separate components, such as a north bridge and a south bridge, for example. Also, in some embodiments some or all of the functionality of I/O interface 2630, such as an interface to system memory 2620, may be incorporated directly into processor 2610.

Network interface 2640 may be configured to allow data to be exchanged between computer system 2600 and other devices attached to a network 2685 (e.g., carrier or agent devices) or between nodes of computer system 2600. Network 2685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2650 may, in some embodiments, include one or more display terminals, keyboards, keypads, touchpads, scanning devices, voice or optical recognition devices, or any other devices suitable for entering or accessing data by computer system 2600. Multiple input/output devices 2650 may be present in computer system 2600 or may be distributed on various nodes of computer system 2600. In some embodiments, similar input/output devices may be separate from computer system 2600 and may interact with one or more nodes of computer system 2600 through a wired or wireless connection, such as over network interface 2640.

As shown in FIG. 26, memory 2620 may include program instructions 2622, which may be processor-executable to implement any element or action to support integrated camera 2690, including but not limited to image processing software and interface software for controlling camera 2690. In some embodiments, images captured by camera 2690 may be stored to memory 2620. In addition, metadata for images captured by camera 2690 may be stored to memory 2620.

Those skilled in the art will appreciate that computer system 2600 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2600 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2600 may be transmitted to computer system 2600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Numerous variations and modifications will become apparent to those skilled in the art once the above disclosure is fully appreciated. It is intended that the following claims be interpreted to embrace all such variations and modifications.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   providing a structured light beam towards a camera system, the camera system including an image sensor and at least one lens, wherein the light beam includes a diffraction pattern of light objects imaged at predefined spatial locations by the camera system;
   capturing, using the image sensor, an image of the diffraction pattern of light objects at each of a plurality of predetermined focus positions for the at least one lens relative to the image sensor;
   assessing a location and a sharpness score of each of the light objects in image space at each of the predetermined focus positions;
   determining a focal length, a distortion and a camera orientation based on the assessed location of each of the light objects at each of the predetermined focus positions;
   determining best focus positions for each of the light objects based on the assessed sharpness score of each of the light objects at each of the predetermined focus positions; and
   generating a map of the best focus positions for each of the light objects, wherein the map of the best focus positions corresponds to a field curvature of the at least one lens.

2. The method of claim 1, wherein providing the light beam includes providing an incident collimated light beam through a diffractive optical element to split the incident collimated light beam into the light objects, and wherein the diffraction pattern of light objects includes light objects provided at controlled, defined angles towards the camera system.

3. The method of claim 1, wherein capturing the image of the diffraction pattern of light objects at each of the plurality of predetermined focus positions for the at least one lens relative to the image sensor includes:
   capturing the image of the diffraction pattern of light objects at a first predetermined focus position;
   stepping the at least one lens from the first predetermined focus position to a second predetermined focus position; and
   capturing the image of the diffraction pattern of light objects at the second predetermined focus position.

4. The method of claim 1, wherein the map includes both tangential and sagittal components corresponding to the field curvature of the at least one lens.

5. The method of claim 1, wherein determining the best focus positions for each of the light objects includes fitting a parabolic curve to data for the assessed sharpness score of each of the light objects versus predetermined focus position, the best focus position being a vertex of the parabolic curve.

6. The method of claim 1, wherein the best focus positions comprise focus positions at which a pixel corresponding to the light object is most in focus in a captured image.

7. The method of claim 1, further comprising storing the map of the best focus positions for each of the light objects in a memory coupled to the camera system.

8. A device, comprising:
a camera having at least one lens and an image sensor;
a computer processor configured to implement operations on images captured by the camera;
a memory configured to store one or more of the images captured by the camera; and
circuitry coupled to the camera, wherein the circuitry is configured to:
capture, using the image sensor, an image of a diffraction pattern of light objects in a structured light beam at each of a plurality of predetermined focus positions for the at least one lens relative to the image sensor, wherein the diffraction pattern of light objects are imaged at predefined spatial locations by the camera;
assess a location and a sharpness score of each of the light objects in image space at each of the predetermined focus positions;
determine a focal length, a distortion and a camera orientation based on the assessed location of each of the light objects at each of the predetermined focus positions;
determine best focus positions for each of the light objects based on the assessed sharpness score of each of the light objects at each of the predetermined focus positions; and
generate a map of the best focus positions for each of the light objects, wherein the map of the best focus positions corresponds to a field curvature of the at least one lens.

9. The device of claim 8, wherein, to capture the image of the diffraction pattern of light objects at each of the plurality of predetermined focus positions for the at least one lens relative to the image sensor, the circuitry is further configured to:
capture the image of the diffraction pattern of light objects at a first predetermined focus position;
step the at least one lens from the first predetermined focus position to a second predetermined focus position; and
capture the image of the diffraction pattern of light objects at the second predetermined focus position.

10. The device of claim 8, wherein the map includes both tangential and sagittal components corresponding to the field curvature of the at least one lens.

11. The device of claim 8, wherein, to determine the best focus positions for each of the light objects, the circuitry is further configured to fit a parabolic curve to data for the assessed sharpness score of each of the light objects versus predetermined focus position, the best focus position being a vertex of the parabolic curve.

12. The device of claim 8, wherein the best focus positions comprise focus positions at which a pixel corresponding to the light object is most in focus in a captured image.

13. The device of claim 8, wherein the circuitry is configured to store the map of the best focus positions for each of the light objects in the memory.

14. A non-transitory machine-readable medium having stored thereon machine-readable instructions executable to cause circuitry coupled to a camera having at least one lens and an image sensor to perform operations comprising:
capturing, using the image sensor, an image of a diffraction pattern of light objects in a structured light beam at each of a plurality of predetermined focus positions for the at least one lens relative to the image sensor, wherein the diffraction pattern of light objects are imaged at predefined spatial locations by the camera;
assessing a location and a sharpness score of each of the light objects in image space at each of the predetermined focus positions;
determining a focal length, a distortion and a camera orientation based on the assessed location of each of the light objects at each of the predetermined focus positions;
determining best focus positions for each of the light objects based on the assessed sharpness score of each of the light objects at each of the predetermined focus positions; and
generating a map of the best focus positions for each of the light objects, wherein the map of the best focus positions corresponds to a field curvature of the at least one lens.

15. The non-transitory machine-readable medium of claim 14, wherein capturing the image of the diffraction pattern of light objects at each of the plurality of predetermined focus positions for the at least one lens relative to the image sensor includes:
capturing the image of the diffraction pattern of light objects at a first predetermined focus position;
stepping the at least one lens from the first predetermined focus position to a second predetermined focus position; and
capturing the image of the diffraction pattern of light objects at the second predetermined focus position.

16. The non-transitory machine-readable medium of claim 14, wherein the map includes both tangential and sagittal components corresponding to the field curvature of the at least one lens.

17. The non-transitory machine-readable medium of claim 14, wherein determining the best focus positions for each of the light objects includes fitting a parabolic curve to data for the assessed sharpness score of each of the light objects versus predetermined focus position, the best focus position being a vertex of the parabolic curve.

18. The non-transitory machine-readable medium of claim 14, wherein the best focus positions comprise focus positions at which a pixel corresponding to the light object is most in focus in a captured image.

19. The non-transitory machine-readable medium of claim 14, wherein the machine-readable instructions cause the circuitry to perform operations comprising storing the map of the best focus positions for each of the light objects in a memory coupled to the camera.

20. The non-transitory machine-readable medium of claim 14, wherein the light beam is a light beam formed by providing an incident collimated light beam through a diffractive optical element to split the incident collimated light beam into the light objects, and wherein the diffraction pattern of light objects includes light objects provided at controlled, defined angles towards the camera.

* * * * *